US012612183B2

(12) United States Patent
De Vos et al.

(10) Patent No.: US 12,612,183 B2
(45) Date of Patent: Apr. 28, 2026

(54) AERONAUTIC GROUND LIGHT FIXTURE WITH RF ANTENNA

(71) Applicant: ADB Safegate BV, Zaventem (BE)

(72) Inventors: Chris De Vos, Wemmel (BE); André Jelu, Hoegaarden (BE); Martin Le Roux, Huldenberg (BE)

(73) Assignee: ADB Safegate BV, Zaventem (BE)

( * ) Notice: Subject to any disclaimer, the term of this patent is extended or adjusted under 35 U.S.C. 154(b) by 60 days.

(21) Appl. No.: 18/843,427

(22) PCT Filed: Jun. 14, 2023

(86) PCT No.: PCT/EP2023/066006
§ 371 (c)(1),
(2) Date: Sep. 3, 2024

(87) PCT Pub. No.: WO2023/242294
PCT Pub. Date: Dec. 21, 2023

(65) Prior Publication Data
US 2025/0178745 A1     Jun. 5, 2025

(30) Foreign Application Priority Data

Jun. 15, 2022     (EP) ..................................... 22179305

(51) Int. Cl.
*G08B 21/00*          (2006.01)
*B64F 1/20*          (2006.01)
(Continued)

(52) U.S. Cl.
CPC ................. *B64F 1/20* (2013.01); *H01Q 1/44* (2013.01); *H01Q 9/0407* (2013.01); *H05B 47/19* (2020.01); *H05B 47/196* (2024.01)

(58) Field of Classification Search
CPC .. B64F 1/20; B64F 1/205; H01Q 1/44; H01Q 9/0407; H01Q 1/22; H01Q 5/30; H05B 47/19; H05B 47/196; H05B 47/22
(Continued)

(56) References Cited

U.S. PATENT DOCUMENTS

| | | | | |
|---|---|---|---|---|
| 4,132,983 A | * | 1/1979 | Shapiro | G08B 5/38 340/331 |
| 5,426,429 A | * | 6/1995 | Norman | G08G 5/51 315/130 |

(Continued)

FOREIGN PATENT DOCUMENTS

| | | |
|---|---|---|
| CN | 207975492 U | 10/2018 |
| WO | 2004017682 A1 | 2/2004 |

(Continued)

OTHER PUBLICATIONS

PCT International Search Report and Written Opinion filed in corresponding PCT Application PCT/EP2023/066006 dated Oct. 4, 2023; 13 pages.
(Continued)

*Primary Examiner* — Mark S Rushing
(74) *Attorney, Agent, or Firm* — Rankin, Hill & Clark LLP

(57) ABSTRACT

An aeronautic ground light fixture (60) comprises a light source arranged in a housing and a directional radio frequency antenna (19). The housing comprises a body part (62) made of an electrically conductive material and having an outer surface (620). A recess (67) is arranged in the body part and the antenna is arranged in the recess. The antenna is a planar antenna having a plane arranged inclined with respect to a mounting plane (64) defined by a circumferential edge (623) of the body part, at an angle between 5° and
(Continued)

FIG 10

45° from the mounting plane, measured in a plane that is perpendicular to a local tangent to the circumferential edge.

20 Claims, 11 Drawing Sheets

(51) Int. Cl.

| | |
|---|---|
| *H01Q 1/44* | (2006.01) |
| *H01Q 9/04* | (2006.01) |
| *H05B 47/19* | (2020.01) |
| *H05B 47/175* | (2020.01) |

(58) Field of Classification Search

USPC ......................................................... 340/952

See application file for complete search history.

(56) References Cited

U.S. PATENT DOCUMENTS

| | | | |
|---|---|---|---|
| 2007/0171632 A1* | 7/2007 | Basile | .................... H05B 47/22 |
| | | | 362/153.1 |
| 2018/0160509 A1 | 6/2018 | Treible, Jr. et al. | |

FOREIGN PATENT DOCUMENTS

| | | | |
|---|---|---|---|
| WO | 2004084154 A1 | 9/2004 |
| WO | 2005094135 A1 | 10/2005 |
| WO | 2005094136 A1 | 10/2005 |
| WO | 2009133102 A1 | 11/2009 |

OTHER PUBLICATIONS

Extended European Search Report filed in corresponding European Application 22179305.2 dated Nov. 16, 2022; 11 pages.
Machine translation of CN207975492 dated Oct. 16, 2018; 14 pages.

* cited by examiner

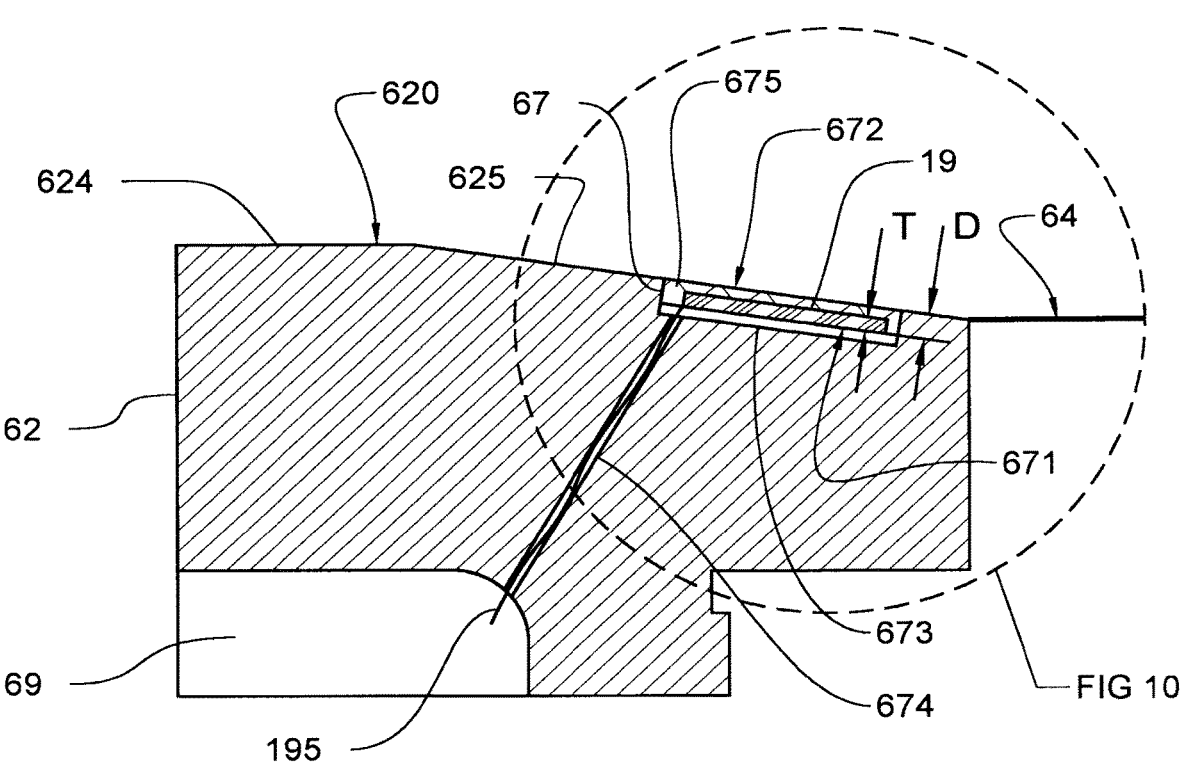
FIG 8: A-A
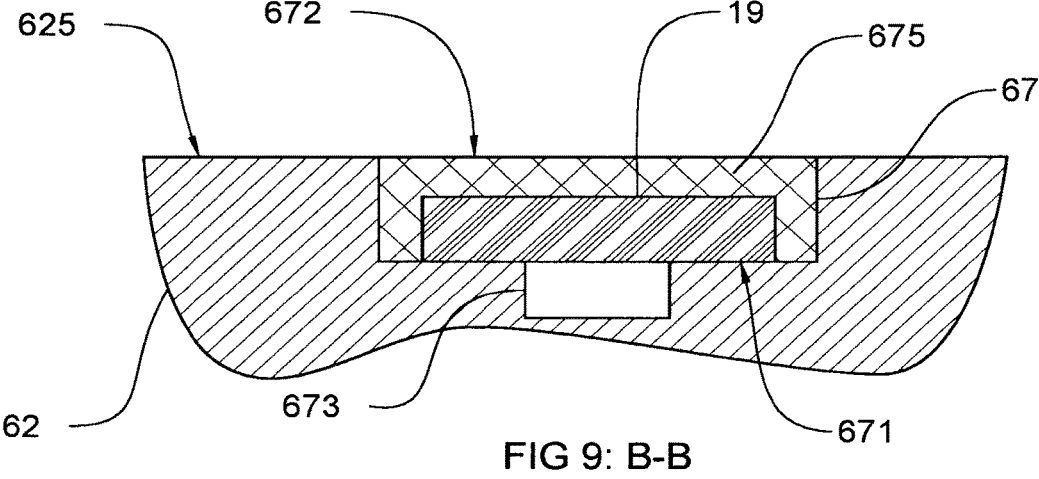
FIG 9: B-B

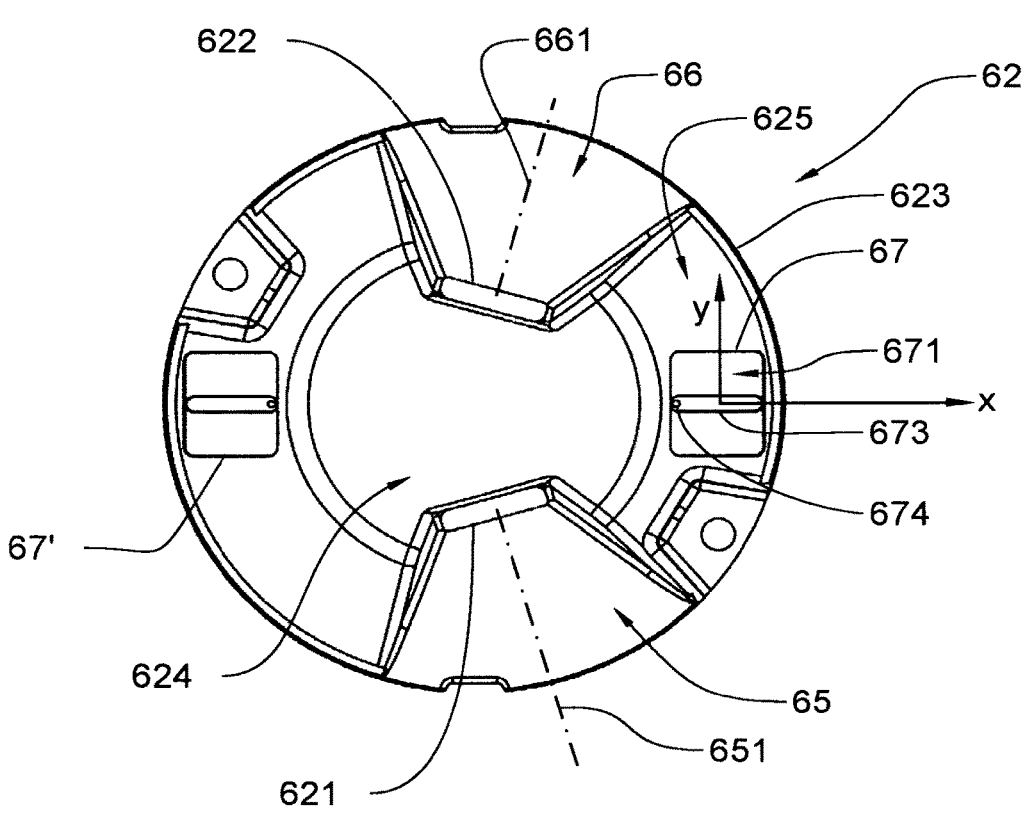
FIG 16
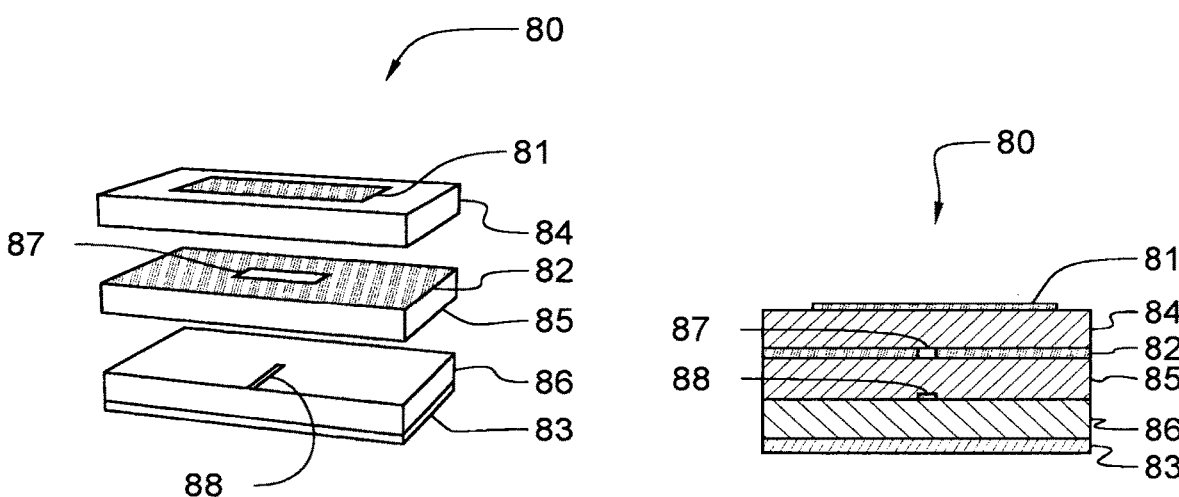
FIG 17A                    FIG 17B

AERONAUTIC GROUND LIGHT FIXTURE WITH RF ANTENNA

TECHNICAL FIELD

The present invention is related to light fixtures with integrated data communication means, particularly for outdoor environments. In particular, the present invention is related to guidance light fixtures, such as aeronautic ground lighting, with integrated antenna systems having minimal exposure.

BACKGROUND ART

There are a large number of lighting devices at aerodromes, such as aeronautic ground lighting (AGL), which may be located in particular on or in the vicinity of aprons, ramps, taxiways or runways, or elsewhere, for example, on buildings such as hangars, on the air traffic control (ATC) tower or on other facilities. Aeronautic ground lighting is utilized in aerodromes worldwide to support pilots during landings, take-off and ground movement of their aircrafts. An AGL system typically includes a power source (e.g., a constant current regulator or CCR), transformers and a plurality of light fixtures arranged in one or a plurality of electrical circuits which are connected to the power source via the transformers.

Control and monitoring of the AGL system, down to the level of individual or group control of the lights, can be provided by both Air Traffic Control operators and maintenance or airport engineering department. Different communication methods are required to provide appropriate control commands to all these pieces of AGL equipment, typically based on power line communication technologies. By way of illustration, an aerodrome lighting system having a control unit and a central communication unit able to communicate with a plurality of lighting devices is known from EP 1523864 and EP 1606785. The lighting devices are connected to the control unit and the central communication unit via a power supply line. Communication between the central communication unit and the lighting devices is performed via the power supply line through an orthogonal frequency-division multiplexing (OFDM) technique in which the data stream is split across a number of narrowband channels in a limited frequency range to reduce interference and crosstalk. The lighting devices comprise at their end an addressable communication gateway device able to communicate with the central communication unit. The data communication via the power supply line can include control commands for operating the lighting devices, and may include measurement data captured by sensors arranged in proximity of the lighting devices.

Along the power supply line galvanic insulating transformers are arranged at each node with a lighting device. The communication gateway devices ae arranged at the secondary side of the transformers, at the side of the lighting device. Since these transformers typically attenuate high frequency signals, dedicated transformers must be used allowing high frequency signals to pass through, increasing installation costs. Yet, the usable frequency bands are typically limited to about 190 kHz, limiting the data bandwidth.

Most AGL circuits are arranged as series circuits. Such a topology further limits the amount of information that can be passed through the circuit for monitoring the operational conditions of the lighting system. The bandwidth does not allow to pass additional information obtained from various sensor or historical data stored at the device. Furthermore, for security reasons, status condition information is typically stored centrally within the control and monitoring system, with limited accessibility by maintenance personnel.

Since the AGL lights provide a distributed system of fixtures covering important areas of the aerodrome, there is a desire to embed additional sensors in the light fixtures, enabling capturing safety critical data, such as environmental conditions on the airfield, passing by of aircraft and other ground traffic, etc. All these sensors may produce a high volume of data which must be transmitted in real-time to central processing units, such as at airport operating centres and the control tower, hence requiring increased bandwidth which cannot be provided by the Power Line Communication techniques described above.

One option to overcome the limited bandwidth is to provide additional wiring between the AGL fixtures, such as fiber optic cables. This is however a costly solution in view of the large area of the aerodrome. In order to increase communication bandwidth there is hence a need to allow individual lights to communicate directly to dedicated servers in a wireless way, providing more information to the various user applications.

However, the incorporation of radio frequency (RF) antennas in such light fixtures is subject to major constraints. Firstly, on the airfield, the light fixtures need to have minimal exposure to jet blast, impact of landing aircrafts and must meet specific FAA (Federal Aviation Administration) and/or ICAO (International Civil Aviation Organization) requirements in terms of mechanical performance, water tightness, operational temperature range and lifetime. Additionally, in the specific case of AGL fixtures, these are inset light fixtures which require to be flush with the ground level. Furthermore, the AGL light fixtures comprise a closed metal enclosure rendering it extremely difficult to get a wireless RF signal through the enclosure.

WO 2005/094135 discloses an inset light with integrated antenna. The top cover includes one or more apertures for housing suitable prisms, rigidly fastened to the top cover and aimed at sending respective light beams. The antenna is situated in the wall of the prism corresponding to the respective aperture and is obtained according to known techniques, e.g. screen printing. The terminals of the antenna are connected to the internal circuitry by an electric connection passing inside the seal, interposed between the prism and the top cover. According to a variant, the antenna is housed inside the seal, or situated (e.g. obtained by screen printing) on its inner surface facing the prism. The positioning of the antenna very near to the aperture allows an emission/reception of the signal without weakening and/or decay in the direction identified by the aperture. However, one drawback of the above solution is that sealing between the top cover and the prism is very difficult, particularly due to the electrical connection with the antenna that must additionally pass through the seal. It will be very difficult to obtain a long-time water tightness, such as over 10 years as required by airport authorities. WO 2005/094136 discloses a similar device, but the top cover is made of an injection mouldable material (synthetic resin) and the antenna is introduced into the mould before moulding operation, and is encapsulated in the top cover. However, synthetic resins and other injection mouldable materials are not preferred for airfield light fixtures because of weaker mechanical performance and temperature/wearing resistance compared to metal enclosures.

SUMMARY

There is therefore a need in the art of providing a light fixture, such as for airfield lights and particularly for AGL, integrating a RF antenna in a reliable manner. There is a need in the art of providing a light fixture allowing a higher amount of information to be communicated and gathered for improved control and data sensing. There is also a need in the art of providing light fixtures allowing easier and faster maintenance and monitoring.

According to a first aspect of the present disclosure, there is therefore provided a light fixture, as set out in the present disclosure and in the appended claims. The light fixture is particularly a guidance light fixture, an inset light fixture, or a combination of both. Particularly, the light fixture is an aeronautic ground light.

A light fixture according to the present disclosure comprises a light source, a housing and an antenna configured to emit and/or receive radio frequency signals. The light source is arranged in the housing. The housing comprises a body part substantially (entirely) made of an electrically conductive material, preferably a metal such as cast aluminium or cast iron. The body part, which can refer to a covering lid of the light fixture, has an outer surface, which advantageously refers to an exposed or external surface. A first recess is arranged in the outer surface. The first recess has a first opening in the outer surface providing access to the recess and preferably comprises a bottom opposite the first opening. The bottom and/or walls of the first recess can be substantially made of the electrically conductive material. The body part advantageously comprises a circumferential edge and the first recess is advantageously arranged adjacent the circumferential edge. The antenna is accommodated in the first recess. Advantageously, the antenna is completely contained in the first recess without protruding parts extending outwards beyond the first opening or the outer surface. In some examples, the antenna is arranged in the first recess such that the antenna is flush with, or first recessed from, a peripheral edge of the first recess.

The body part can refer to a lid of the light fixture. The body part can comprise one or more through openings which are closed by respective optical windows and one or more light sources are configured to emit light through the one or more optical windows. The one or more through openings can be arranged in respective second recesses, advantageously distinct and spaced apart from the first recess of the antenna.

According to a first aspect, the antenna is a directional antenna. In addition or alternatively, the antenna is a planar antenna. The antenna can have a plane substantially parallel to a bottom of the first recess, or parallel to a plane of the first opening of the first recess. The antenna can be arranged on the first recess bottom, such as in contact with it.

According to a second aspect, the antenna comprises an axis associated with a resonant length. The antenna is mounted in the first recess with the axis being substantially parallel to a local tangent to the circumferential edge. Defining a mounting plane of the light fixture by a plane of the circumferential edge, the axis of the antenna is advantageously parallel to the mounting plane. Another axis of the antenna perpendicular to the resonant length axis can be arranged inclined with respect to the mounting plane, e.g. when the bottom of the first recess is inclined.

With any of the above features, an RF antenna can be provided on an electrically conductive light fixture while still obtaining a workable antenna signal (gain) along useful directions, such as towards other adjacent light fixtures, particularly for UWB communication signals, or towards a radio base unit, particularly for 5G (cellular) communication signals. This is particularly useful in light fixtures including relatively thick or large metal housing parts, such as AGL light fixtures and other (outdoor) inset lights, where otherwise it is very difficult to get a suitable antenna signal out of the light fixture. Since the antenna is recessed with respect to the outer surface of the light fixture, exposure of the antenna outside the volume of the light fixture is minimal or even prevented, and resistance to mechanical impact or jet blast is kept high. Furthermore, the first recess can be easily sealed water tightly, e.g. utilizing suitable potting compounds. Such potting compounds advantageously do not significantly affect or weaken the wireless antenna signal. These aspects are particularly important for outdoor light fixtures, particularly for inset lights, and specifically for aeronautic ground lights or other airfield inset or substantially flush mounted lights.

To obtain a desired signal coverage while maintaining the footprint of the antenna minimal, multiple first recesses with respective antennas, e.g. at a plurality of spaced apart angular orientations about the circumferential edge, can be provided. Providing a plurality of antennas at distributed angular positions can improve signal coverage. In one advantageous example, at least a second recess and respective antenna is arranged at a diagonally or diametrically opposite end of the body part with respect to the first recess and respective (first) antenna. Two possibly identical antennas can hence be arranged diagonally or diametrically opposite (at about 180° from one another) along the circumferential edge of the body part to obtain a workable signal in desired directions. The second antenna can be configured to operate simultaneously and/or in synchronization with the first antenna. The second antenna can act as a back-up in case of failure of the first antenna. Alternatively, once the light fixture is installed, the antenna having optimal orientation towards the base station can be utilized for operation, while the other antennas possibly remain inoperative. This allows a more flexible positioning of the light fixture with respect to the base station or other radio beacon (e.g., an adjacent light fixture) during mounting, reducing installation effort. It is possible that different antennas operate for different wireless communication technologies, e.g. a first antenna for cellular communication technology and a second antenna for UWB signals. In such cases the antennas can have different size and/or geometry and may be of different type. Each antenna may comprise its individual driver and communication gateway device, or the antennas can be coupled to a same or single driver and/or communication gateway device.

Advantageously, the body part can comprise a sloped portion which is inclined with respect to a mounting plane of the light fixture. The mounting plane can refer to a plane defined by a circumferential edge of the body part or of the light fixture. The first recess is advantageously arranged on the sloped portion. The sloped portion is advantageously adjacent the circumferential edge and can have an angle of inclination between 5° and 30° from the mounting plane, measured in a plane that is perpendicular to a local tangent to the circumferential edge. The slope of the sloped portion is such that an elevation of the outer surface with respect to the mounting plane increases from the circumferential edge going inwards. Advantageously, the outer surface has a central or inner portion which is elevated with respect to the mounting plane of the light fixture. The sloped portion can extend peripherally to the inner portion.

Advantageously, a plane of the antenna (e.g., in case of a patch, slot, Vivaldi or loop antenna) is arranged inclined with respect to a mounting plane, such as defined by a circumferential edge of the body part, advantageously at an angle between 5° and 30° from the mounting plane, measured in a plane that is perpendicular to a local tangent to the circumferential edge. The inclination of the antenna plane is advantageously such that an elevation of the antenna (plane) with respect to the mounting plane increases from the circumferential edge going inwards. Advantageously, the angle of inclination of the antenna is between 5° and 20°, such as between 5° and 17°. These inclination angles can correspond to slope angles of the outer surface of the body part and aid in achieving minimal exposure, while improving directivity of the antenna signal in useful directions, such as in a direction parallel to the mounting plane (e.g., a horizontal direction) and radially outward with respect to the circumferential edge.

Advantageously, the antenna is configured such that along a radial direction of a circumferential edge of the body part and parallel to a mounting plane defined by a plane of the circumferential edge, a radiation pattern of the antenna (when mounted in the first recess) has a gain in direction towards the circumferential edge at least 2 dBi, advantageously at least 3 dBi, advantageously at least 4 dBi, advantageously at least 5 dBi higher than a gain in an opposite direction.

In exemplary embodiments, the antenna can be a patch, slot, Vivaldi or loop antenna. The antenna is advantageously a patch antenna. Such a patch antenna may comprise at least three electrically conductive layers (71, 72, 73) stacked on one another at a spaced apart distance. These multiple conductive layers are advantageously tuned to different, e.g. adjacent, resonant frequencies. By so doing, the bandwidth of the antenna can be increased without increasing antenna footprint and with only a minimal increase in antenna thickness.

Advantageously, the antenna is configured to emit and/or receive radio frequency signals in a frequency range between 3.1 GHz and 10.6 GHz, preferably between 3.1 GHz and 4.7 GHz. The light fixture can comprise a suitable communication module, such as or including an antenna driver configured for operation in the given frequency range. The communication module is advantageously housed in an internal space defined by the housing. The body part can form a cover of the internal space and can comprise a through hole from the internal space to the first recess, in which a feed wire from the communication module to the antenna can be provided.

According to a second aspect of the present disclosure, there is provided an aerodrome signalling system which comprises a plurality of light fixtures according to the first aspect and a central communication unit configured for data communication with the plurality of light fixtures. The plurality of light fixtures and possibly the central communication unit comprise a wireless data communication device coupled to a respective antenna. The wireless data communication device can be configured for wireless, e.g. cellular, communication of measurement data in relation to one or more of: an environmental condition, a meteorological condition, a presence of a (foreign) object, a movement of a (foreign) object and a status condition relating to the respective light fixture and/or light source, and possibly further data representing a condition of the aerodrome signalling system, or of control signals for operating the aerodrome signalling system. The measurement data is captured by one or more sensor devices incorporated in the light fixtures. The wireless data communication device can communicate or co-operate with a communication device for data communication via a power supply line through which the at least one light fixture is supplied with electric power.

BRIEF DESCRIPTION OF THE FIGURES

Aspects of the invention will now be described in more detail with reference to the appended drawings, wherein same reference numerals illustrate same features and wherein:

FIG. 8 represents a cross-sectional view along section line A-A of the cover of FIG. 7;

FIG. 9 represents a cross-sectional view along section line B-B of the cover of FIG. 7;

FIG. 16 represents a top view of the cover lid of an exemplary embodiment of an aeronautic taxiway and apron light.

FIG. 17A represents an exploded view of various layers of an aperture coupled patch antenna. FIG. 17B represents a cross section of the aperture coupled patch antenna of FIG. 17A.

DETAILED DESCRIPTION

Figure 1:
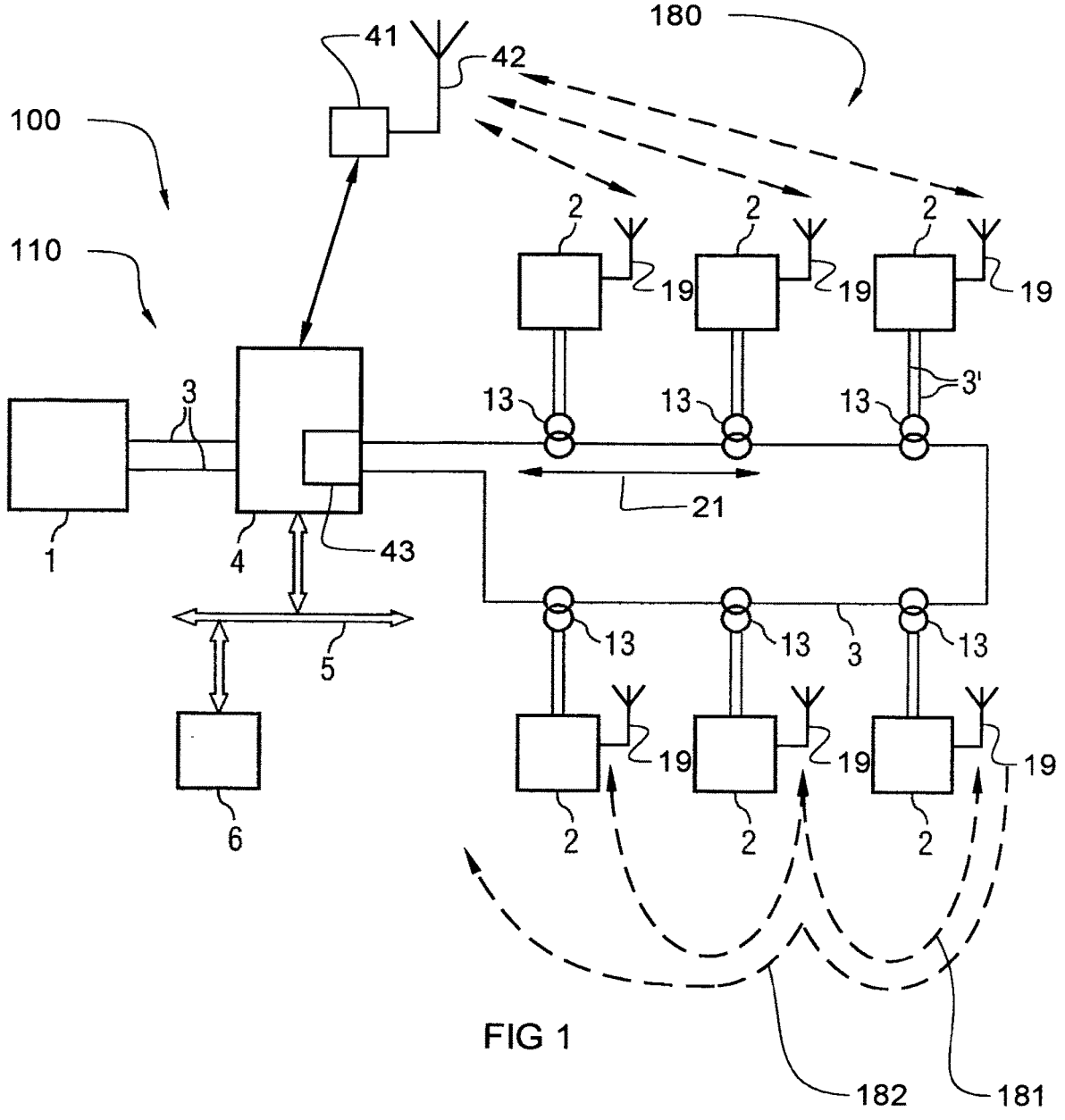
FIG. 1 represents a diagram of a signalling system according to aspects of the present disclosure.

Referring to FIG. 1, a signalling system 100 for an aerodrome, such as an airport, comprises a control unit 110 and a plurality of signalling units 2. The control unit comprises a power supply device 1, such as a constant current regulator (CCR), or a distributed parallel power system. The signalling units 2 are connected to the power supply device 1 via a power supply line 3. The power supply line 3 forms a series power supply circuit to which the signalling units 2 are connected in series. The power supply line 3 could, however, also form a parallel power circuit with the signalling units 2 connected in parallel.

The signalling units 2 comprise one or more signalling devices and may further comprise one or more sensor devices. The signalling devices may refer to lighting devices, such as aeronautic ground lighting (AGL) devices as defined in ICAO (International Civil Aviation Organisation) Annex 14. The signalling devices may alternatively or additionally refer to visual guidance devices such as stop bars and airfield light signs. The sensor devices may refer to sensors suitable for use at an aerodrome site, such as direction sensors, sensors for aircraft detection and aircraft classification, torque sensors (e.g. for sensing or monitoring the torque applied by a bolt) and vibration sensors. The sensor devices may alternatively or additionally refer to, for example, devices for detection of wind direction and intensity and signalling thereof, as well as other types of detection and signalling apparatuses for meteorological or environmental data (i.e., an environment surrounding the light fixture), such as temperature, humidity and light conditions. The sensor devices may alternatively or additionally refer to sensors for detection of gas and/or water in cable ducts, as well as visual detection devices, such as video cameras, for monitoring the runway area, taxiway area, Apron, and any other area of the aerodrome or airfield. It will be convenient to note that all the above sensors refer to non-cooperative sensors. In particular, these sensors do not co-operate with the aircraft or vehicle passing by, e.g. they are not configured to intercept signals emitted by such aircrafts or vehicles to make the detection. Alternatively, or in addition, the sensor devices can refer to devices configured to sense a condition of a component of the light fixture, such as a status condition (e.g., failure, intensity of light, temperature) of the light source or other component housed within the light fixture, or of the light fixture housing itself.

The control unit 110 of the aerodrome signalling system 100 further comprises a central communication unit 4. The central communication unit 4 is advantageously looped in to the supply line 3. The signalling units 2 are therefore connected via the same supply line 3 to both the power supply device 1 and the central communication unit 4.

The central communication unit 4 is connected, e.g. via a data communication network 5, to a master control unit 6, which may be provided in proximity of the central communication unit 4, or remotely. The central communication unit 4 can receive from the master control unit 6 setpoint data which it forwards to the signalling units 2. Additionally, the central communication unit 4 can receive from the signalling units 2 status reports which it forwards to the master control unit 6. The master control unit 6 is in this way configured to operate as an aerodrome management system, as described, for example, in DE 101 04 950 A1, DE 199 49 737 A1 or EP 0 883 873 B1.

Figure 2:
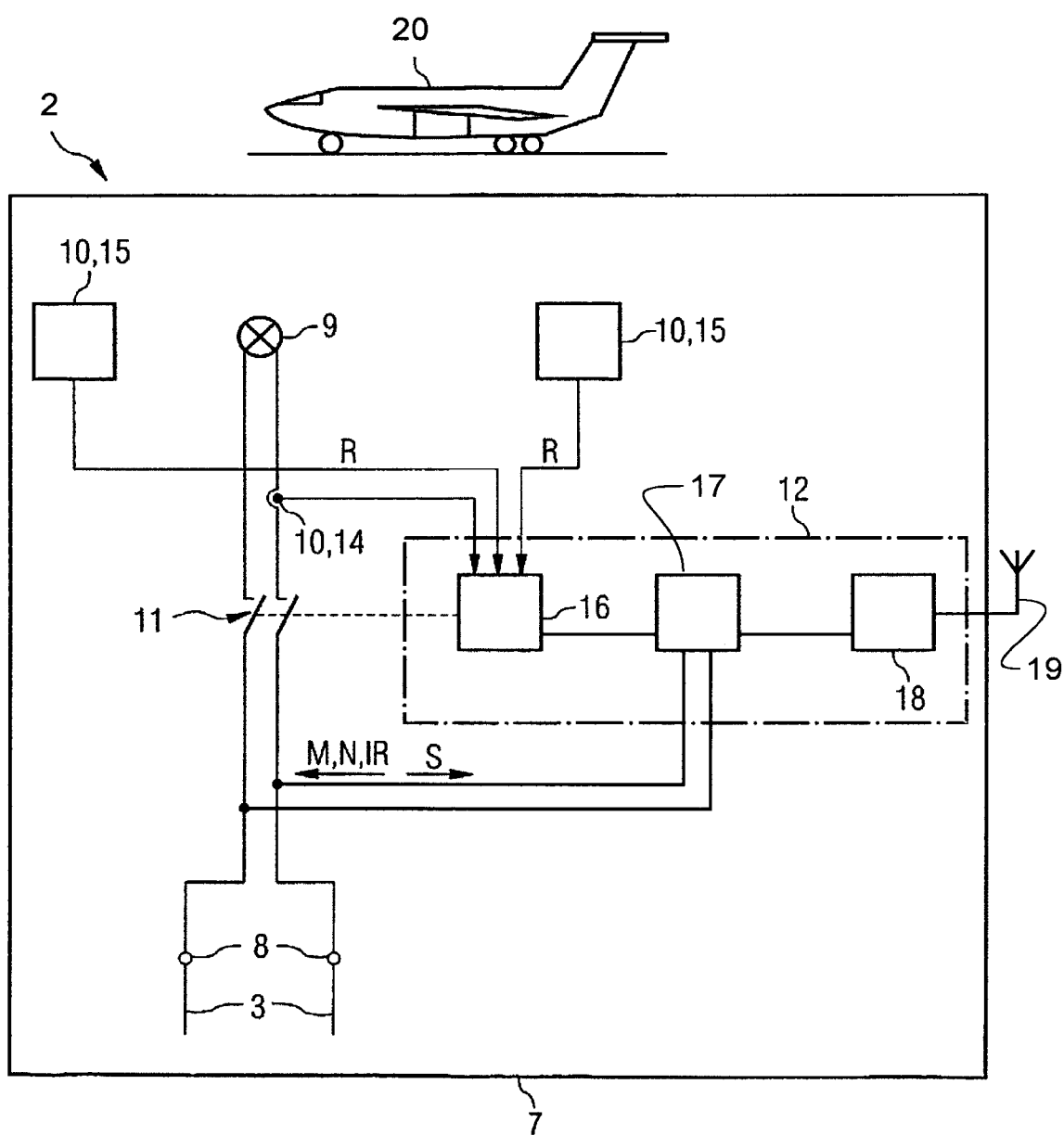
FIG. 2 represents a diagram of a first signalling unit used in the signalling system of FIG. 1.

Referring to FIG. 2, each signalling unit 2 comprises a housing 7 in which one or a plurality of signalling devices, such as a lighting device 9, optionally one or more sensor devices 10 as described above, and a local control unit 12 are arranged. Connection terminals 8 are provided in the housing 7 for connecting the lighting device 9 and optionally the sensor devices 10, to the power supply line 3. A switching device 11 can further be provided. The lighting device 9 can comprise one or a plurality of lights. The switching device 11 is configured to operate the lighting device 9, and/or any other switchable sensor device 10 arranged in the housing 7. The switching device 11 and the local control unit 12 are connected to the connection terminals 8.

Referring again to FIG. 1, a transformer 13 is connected to the connection terminals 8. The transformer 13 enables the connection of the signalling units 2 to the power supply line 3 while ensuring galvanic insulation. The connection can be effected via spur lines 3' which can have a line length up to 200 m, preferably 100 m or less. Alternatively, the transformer is connected downstream of the connection terminals 8, e.g. between connection terminals 8 and switching device 11 and/or local control unit 12. Transformer 13 can be provided outside, or inside housing 7.

According to one aspect, the signalling system 100 comprises a first communication gateway device 41 coupled to a radio antenna 42. First communication gateway device 41 is configured for wireless data communication via antenna 42. The wireless data communication can be effected by the first gateway device 41 according to any suitable wireless data communication protocol, particularly a wireless data communication protocol for cellular radio communications, e.g. based on orthogonal frequency division multiplexing (OFDM), such as 4G, 5G, etc., or according to an ultra-wide band (UWB) data communication protocols. The radio signals of these wireless data communication protocols have a frequency range typically between 3.1 GHz and 4.7 GHz for 5G and UWB—Group 1 and between 5.9 GHz and 10.6 GHz for UWB—Group 2. The first communication gateway device 41 can form a base station of the wireless data communication protocol and can be located at any convenient position on the aerodrome. By way of example, a wired data communication line connects the first communication gateway device with the central communication unit 4. In one specific example, the first communication gateway device 41 can be integrated inside the central communication unit.

The signalling system 100 can comprise a second communication gateway device 43, configured for wired data communication. In particular, second communication gateway device 43 is connected to power supply line 3 and configured for superimposing a communication signal on the power signal (voltage and/or current) through power supply line 3.

Referring again to FIG. 2, the local control unit 12 comprises a processing device 16, such as a microprocessor, and a third communication gateway device 18 coupled to a radio antenna 19. Third communication gateway device 18 is configured for wireless data communication via antenna 19. The wireless data communication can be effected by the third gateway device 18 according to any suitable wireless data communication technology, particularly a wireless data communication technology for cellular radio communications, e.g. based on orthogonal frequency division multiplexing (OFDM), such as 4G, 5G, etc., or according to an ultra-wide band (UWB) data communication technology. The radio signals of these wireless data communication technologies have a frequency range typically between 3.1 GHz and 4.7 GHz for 5G and UWB—Group 1 and between 5.9 GHz and 10.6 GHz for UWB—Group 2. In addition, the local control unit 12 can comprise a fourth communication gateway device 17 configured for wired data communication, in particular via power supply line 3 or any other wired communication line, such as optical fibre. The second and the fourth communication gateway devices 43 and 17 are configured to communicate with one another, either unidirectionally, or bidirectionally, via power supply line 3 or any other wired data communication line. The third communication gateway device 18 and the fourth communication gateway device 17 are operably coupled to processing device 16.

The first and the third communication gateway devices 41 and 18 can be configured to communicate with one another, either unidirectionally, or bidirectionally, via respective antennas 42 and 19. By way of example, the first communication gateway device 41 can be configured to set up a wireless communication network 180 in which the third communication gateway devices 18 are configured to communicate via respective antennas 19. Alternatively, the third communication gateway devices 18 of the signalling units 2 can be configured to communicate directly with other third communication gateway devices located in proximity, e.g. via an ultra-wide band (UWB) communication technology 181. An UWB communication technology can include relay- ing or forwarding of messages from one third communica- tion gateway device to e.g. the first communication gateway device 41 via one or more other third communication gateway devices as illustrated by the dashed arrow line 182 in FIG. 1.

The central communication unit 4 is configured to trans- mit control signals S to the local control unit 12 of each signalling unit 2. The transmission of control signals S can be effected in different ways. According to a first possibility, as can be seen from FIGS. 1 and 2, control signals S are communicated as a message signal 21 via power supply line 3. In particular, signals S are superimposed on the AC (50 Hz or 60 Hz) voltage or current signal fed via power supply line 3 for supplying power to the signalling devices 9, 10. By way of example, signal S can be superimposed as an OFDM signal as described above, which can comprise one or more non-overlapping narrowband frequency channels, advanta- geously in a frequency range between 20 and 190 KHz. The frequency channels can be parameterized by the second or fourth communication gateway devices. Alternatively, sig- nal S can be superimposed by time slot synchronization and using a controlled high impedance at the secondary side of the transformers 13 for communicating pulses contained in pulse signals, as described in WO 95/24820. It will be appreciated that yet alternative power line communication techniques as known in the art may be used in the systems described herein, in particular frequency modulation schemes for data communication, such as frequency-shift keying (FSK) signals transmitted via the power supply line.

The control signals S are transmitted by the second communication gateway device 43 as a superimposed mes- sage signal 21 via power supply line 3, and are received by the fourth communication gateway device 17. Each fourth communication gateway device 17 of the signalling units 2 can be separately addressable by the second communication gateway device 43 to receive a dedicated control signal S. The control signals S received by the fourth communication gateway device 17 are transferred to processing device 16 which is configured to process the control signals S for e.g. operating switching device 11, lighting device 9 and/or one or more sensor devices 10. Suitable examples of control commands are switching ON or OFF of the lighting device 9, controlling the light intensity of lighting device 9, que- rying a sensor device 10.

According to a second possibility, the control signals S are communicated as a wireless signal between the central communication unit 4 and the signalling units 2. To this end, the control signals S are transmitted by the first communi- cation gateway device 41 via antenna 42 and are received by the third communication gateway device 18 of the signalling unit 2 via antenna 19. These messages can be communicated via any one of wireless networks 180, 181 or 182. Possibly, the network is configured to determine an appropriate trans- mission route via multiple antennas 19 and third communi- cation gateway devices.

The central communication unit 4 can be configured to select an appropriate transmission route for the control signals S, i.e. via a wired (devices 43/17) or wireless (devices 41/18) route. By way of example, the central communication unit 4 can be configured to select the trans- mission route based on the type of control signal S, e.g. control signals relating to operating the lighting device 9 sent via power supply line 3, whereas control signals relating to operating the sensor devices 10 sent wirelessly.

Communication gateway devices 41, 18 advantageously act as transceivers in the wireless network. The wireless network van be a cellular communication network, advan- tageously a private cellular network, such as a private 5G cellular network, particularly configured for mission critical data communication. In the present disclosure, the term '5G' can refer to any radio access technology operating according to the International Mobile Telecommunications-2020 (IMT-2020) standard issued by the Radiocommunication Sector (ITU-R) of the International Telecommunication Union (ITU), and/or according to any one of the 5G radio access technologies set out by the 3GPP ($3^{rd}$ Generation Partnership Project) consortium, such as but not limited to 5G NR (New Radio), LTE-M (Machine Type communica- tion) and NB-IoT (Narrowband Internet-of-Things). In the context of the present disclosure, the term '5G' can addi- tionally refer to any further evolving cellular communication technology, such as 6G and 6GE, and which advantageously allows setting up private, i.e. non-public cellular radio communication networks, specifically for mission critical communication.

Referring to FIG. 2, the sensor device 10 can comprise a first sensor 14 and/or a second sensor 15. By means of the first sensor 14, an internal state of the signalling unit 2 and/or the lighting device 9 can be detected and transmitted to the local control unit 12. For example, by means of the first sensor 14 it can be detected whether an electric current is flowing through the lighting device 9, or whether the light- ing device 9 is emitting light, and possibly at which light intensity. The processing unit 16 can receive a measurement signal R from the first sensor and determine, e.g. in con- junction with the (known) switching state of switching device 11, whether the lighting device 9 is defective. A corresponding monitoring message M (e.g. switched on/switched off/flashing/defective) can optionally be trans- mitted by the local control unit 12 via the third gateway device 18 (wirelessly via antenna 19), or via the fourth gateway device 17 (e.g. as OFDM signal).

The second sensor 15 is configured to detect a state which prevails in the environment outside the signalling unit 2 or housing 7, e.g. a weather condition (temperature, humidity), or an environmental condition (ambient light intensity, day or night), or to detect objects passing by, such as aircraft or vehicles, in a non-cooperative manner. The second sensor can e.g. be configured as a magnetic-field sensor. The presence or absence of an object 20 can be detected by means of the magnetic-field sensors 15, particularly if the signalling unit 2 is installed in a take-off runway, a landing runway or a taxiway of an aerodrome. This applies particu- larly when the object 20 is a metal object, e.g. an aircraft 20 or a motor vehicle. When two second sensors 15 are arranged at a spaced apart distance along a motion direction (either in a same signalling unit 2, or in two different signalling units 2), the speed of the object 20 can also be determined. Alternatively, the second sensor 15 can be configured as a radar sensor, e.g. a microwave transceiver. In a further example, the second sensor 15 can be configured to detect a meteorological or environmental characteristic. The meteorological or environmental characteristic can be, for example, the temperature, the wind speed, precipitation (e.g. rain, snow) or visibility conditions (e.g. day/night/fog).

Other characteristics can alternatively or additionally be detected by means of the sensor device 10 or 15. Examples of such characteristics are vibrations, (external) noise, air or ground humidity, photometrics and internal states or operational conditions (e.g. temperature) of the signalling unit 2 other than states or operational conditions referring to the lighting (signalling) device 9, the latter being captured by the first sensor 14. Any suitable sensor can be used for this purpose. Some examples of the second sensor 15 can be configured to monitor an operational condition of the housing 7 and/or any other structure related to the signalling unit 2 other than the lighting device 2, e.g. torque sensors sensing the torque applied by e.g. a bolt and/or sensors for detection of gas and/or water, e.g. to monitor sealing conditions of the housing 7, such as broken window or loosened cover. Furthermore, the detection of objects and their identification can also be effected with non-cooperative sensors other than radar or magnetic-field sensors. For example, optical sensors (e.g. cameras) can be used, by which not only the presence of an object but also its shape and/or movement and movement direction may be detected.

The signal R generated by the second sensor 15 can be transmitted to the local control unit 12, which is processed by the processing device 16 to determine a useful signal N therefrom. The useful signal N can be transmitted by the local control unit 12 via the third communication gateway device 18 (wirelessly via antenna 19).

If the signalling units 2 operate on the basis of synchronization on a shared time base, it is also possible to transmit through signal N the respective detection time. To this end, a time synchronization signal is advantageously received through antenna 19 and the third communication gateway device 18, e.g. within a mission critical private cellular radio communication network.

The local control unit 12 can further be configured to transmit to the central communication unit 4 a signal transmission request e.g. in the form of an interrupt request IR. This can be effected either via the fourth communication gateway device 17, as a superimposed message signal 21 via power supply line 3, or wirelessly—if applicable according to the communication protocol used—via the third communication gateway device 18. If, for example, one of the local control units 12 notices a defect in the lighting device 9, it can send a signal transmission request IR to the central communication unit 4, allowing the central communication unit 4 to address in a targeted manner the local control unit 12 from which the signal transmission request IR originated. The signal transmission request IR can comprise, in addition to an identifier of the signalling unit 2 (local control unit 12), a code, from which the central communication unit 4 can recognize the type of signals to be transmitted. For example, different codes can be used for recognizing an object 20, for modifying a meteorological identifying characteristic or for modifying an internal state of the aerodrome signalling unit (e.g. failure of the lighting device 9).

It is alternatively possible for the local control units 12 to feed not only an interrupt request IR, but along with it also the useful signal N itself to the central communication unit 4. Such type of transmission, however, requires some form of collision monitoring, as known in the art.

It will be appreciated that the wired communication via the second and fourth communication gateway devices 43, 17 can proceed through other cables than the power supply line, e.g. through dedicated data communication cables, such as optical fibres, when available.

Typically, transformers 13 are optimized for power transmission frequencies, but not for data signal transmission frequencies. They can therefore significantly dampen the transmitted data signals S, M, N, IR. To avoid such problems, dedicated transformers having reduced high frequency damping characteristics can be used, but at a penalty of increased cost. In addition, or alternatively, the second and fourth communication gateway devices 43, 17 preferably comprise repeaters for signal conditioning and amplification and means for measuring the reception strength and quality of the signals S, M, N, IR transmitted via the power supply line 3 as superimposed message signals. The reception strength and quality is also preferably transmitted via the power supply line 3 to the central communication unit 4. This advantageously allows the central communication unit 4 to monitor the condition of the overall communication system. By evaluating the information transmitted about transmission quality and signal strength, the central communication unit 4 is consequently advantageously able to configure the communication system for each individual transmission operation. In particular, the central communication unit 4 can, by transmitting corresponding control signals S, stipulate which of the fourth communication gateway devices 17 is to perform repeater functions in each case and which not. In this way, adequate transmission quality in the communication system is constantly ensured. At the same time, the power outlay needed for this, as well as crosstalk behaviour and background noise, can be optimized through dynamic adaptation of the wired communication network.

Figure 3:
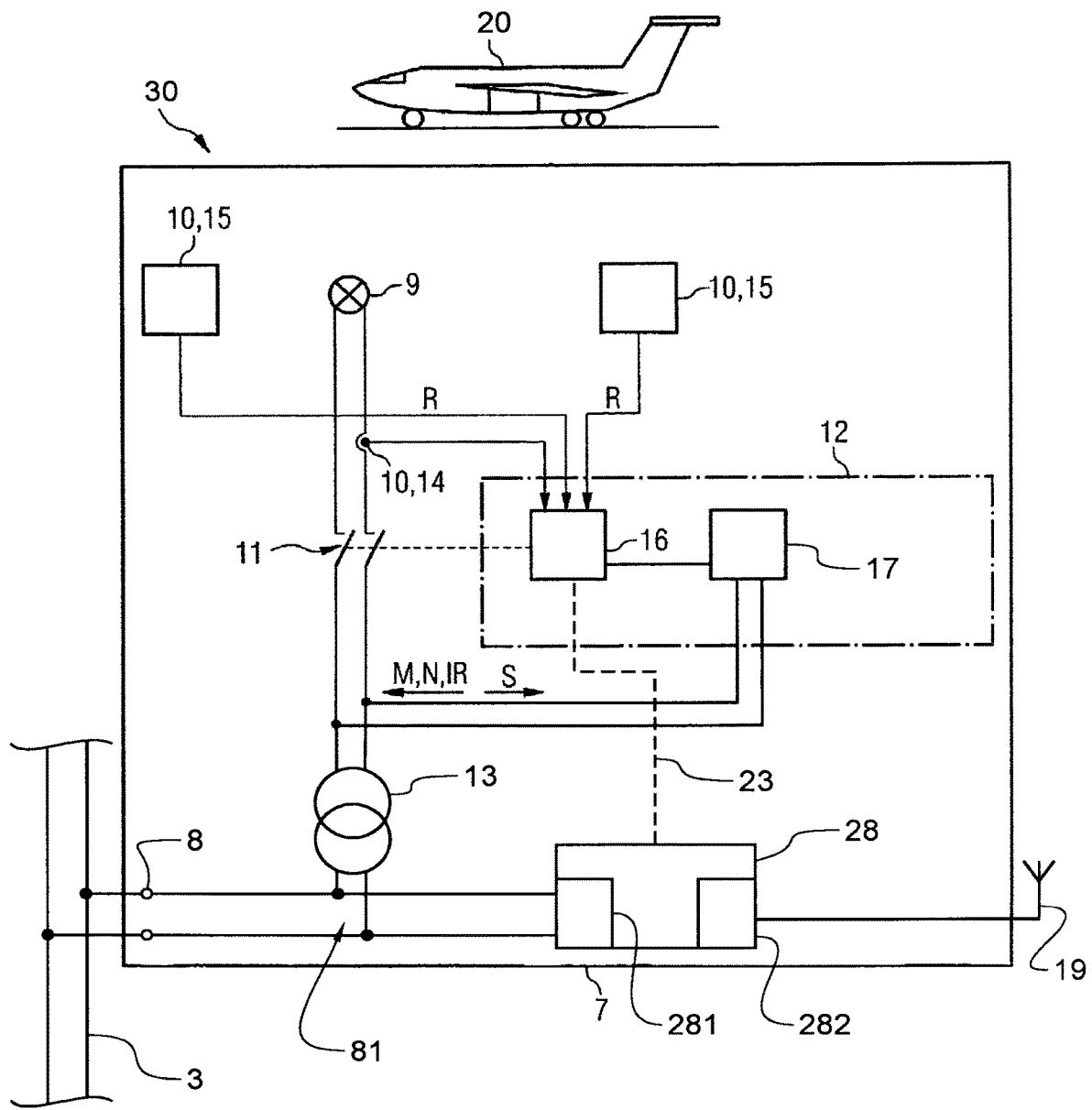
FIG. 3 represents a diagram of a second signalling unit that can be used in the signalling system of FIG. 1.

Referring to FIG. 3, an alternative embodiment of a signalling unit 30 differs from the signalling unit 2 of FIG. 2 in that it comprises a fifth communication gateway device 28 for wireless data communication which is connected to the power supply line 3 through a connection node 81 upstream of transformer 13. The fifth communication gateway device 28 comprises a power line communication module 281 allowing to transmit and/or receive signals via power supply line 3, which may be similar to the fourth communication gateway device 17, and a wireless data communication module 282 for wireless, e.g. cellular or UWB communication of signals via antenna 19. The fifth communication gateway device 28 can be configured to wirelessly transmit, via antenna 19 through a wireless communication network, any data signals received via power supply line 3, or to feed into power supply line 3 any data signal received via antenna 19.

The fifth communication gateway device 28 can be coupled to the local control unit 12 for data communication through a (wired) data communication line 23. In this case, the fifth communication gateway device 28 can replace either one of the third and fourth communication gateway devices 18 and 17, or both, which therefore may be absent from the local control unit 12. In the example of FIG. 3, the fourth communication gateway device 17 is provided, whereas the third communication gateway device 18 is not provided.

One advantage of the fifth communication gateway device 28 is that it allows to provide a direct interface between the power supply line communication and the cellular communication network, bypassing the transformer 13. Consequently, the power line communication module 281 suffers much less from signal dampening by transformer 13. As a result, cheaper transformers 13 can be used and/or signal repeaters or conditioners can be dispensed with, resulting in more economical communication gateway devices. Furthermore, the network communication protocols implemented for power supply line communication may feature some similarities with the cellular network communication protocols used for wireless transmission via antenna 19, e.g. OFDM. By providing a direct link between the communication modules 281 and 282, signal conversion between the power line communication and the wireless communication can be made easier.

Figure 4:
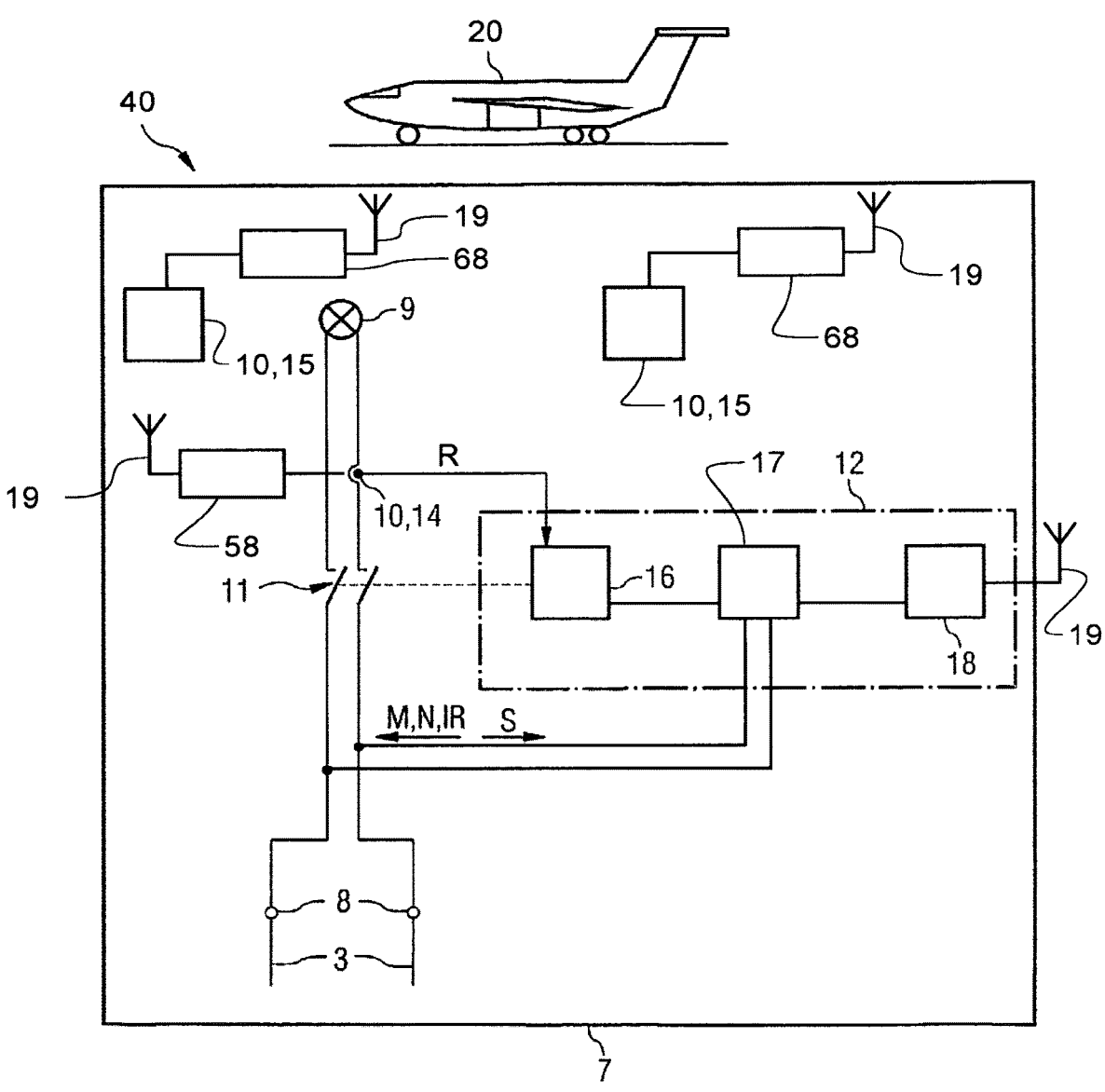
FIG. 4 represents a diagram of a third signalling unit for use in the signalling system of FIG. 1.

Referring to FIG. 4, yet another embodiment of a signalling unit 40 differs from signalling unit 2 of FIG. 2 in that one or more signalling devices 14, 15 comprise their own, distinct wireless communication gateway device 58, 68 directly coupled thereto. By way of example, the sensor device 14 comprises a dedicated wireless communication gateway device 58 and respective antenna 19. The sensor device 15 comprises a dedicated wireless communication gateway device 68 and respective antenna 19. The wireless communication gateway devices 58, 68 may or may not be operably connected to the local control unit 12, i.e. direct data communication between local control unit 12 and wireless communication gateway devices 58, 68 may or may not be possible.

Wireless communication gateway devices 58, 68 may be configured to receive measurement and/or monitoring signals from the respective sensor devices 14, 15 to which they are coupled, and to transmit the measurement and/or monitoring signals wirelessly via their respective antennas 19 over a wireless communication network. The local control unit 12 may in this case still comprise the third communication gateway device 18, e.g. for wireless communication of signals, in particular control signals S, relating to operation or monitoring of the lighting device 9. Alternatively, a wireless communication gateway device (not shown) can be directly coupled to lighting device 9, which may or may not be operably connected to processing device 16. Such a type of installation may be particularly useful in case of retrofitting existing installations, or when additional signalling devices, such as sensor or lighting devices, are added to the signalling unit 50 and for which no communication protocol exists via power supply line 3.

It will be appreciated that some sensor devices, such as sensors 15, arranged within a signalling unit 2, 30, 40, can be provided with their own power sources. Alternatively, the sensor devices can draw power from the power supply line 3.

Figure 5:
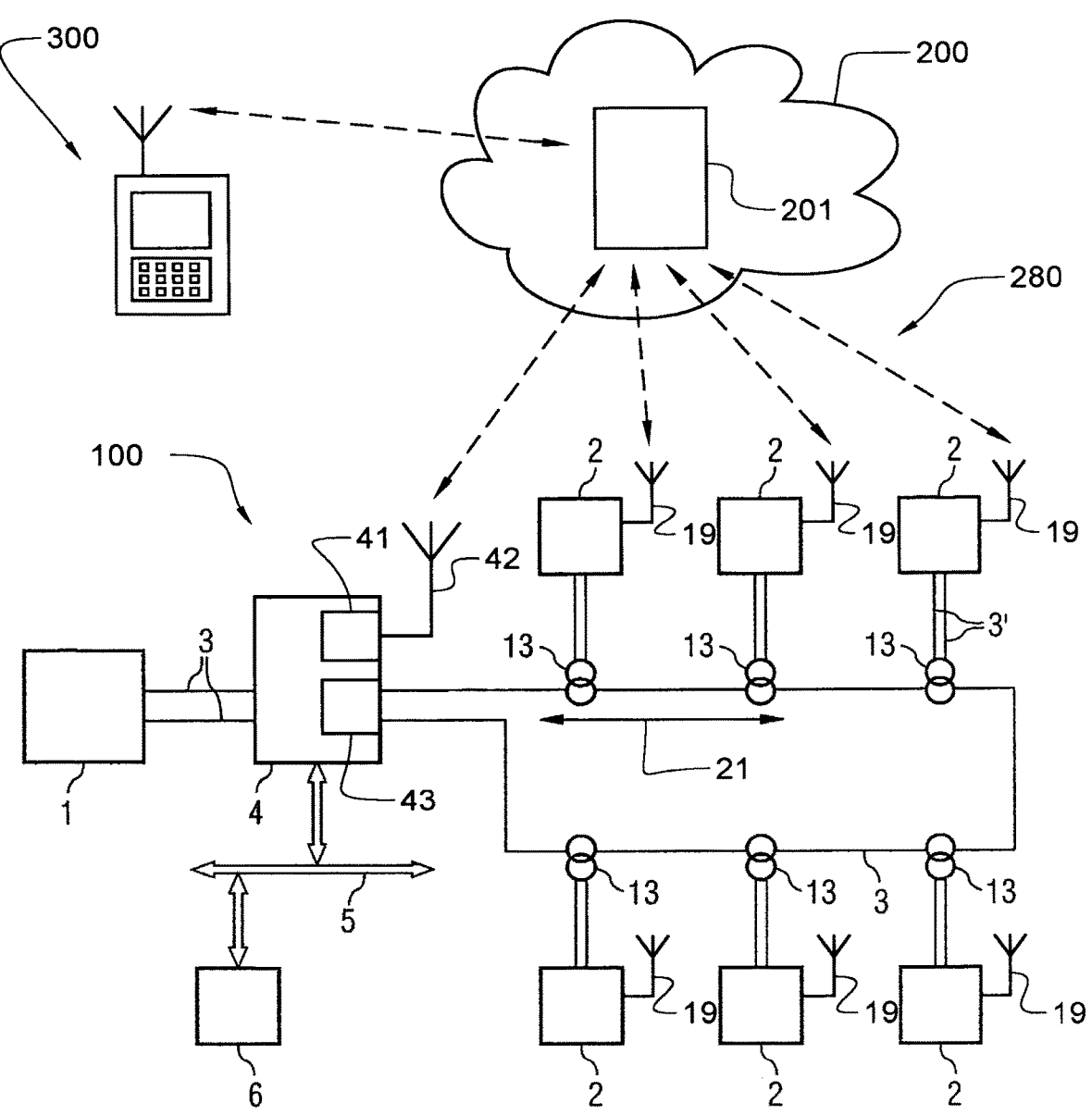
FIG. 5 represents a diagram of the signalling system of FIG. 1 with cellular data communication capability to a cloud network.

Referring to FIG. 5, any one of the wireless communication gateway devices 41, 18, 282, 58, 68 described previously is advantageously configured to communicate with a cloud network 200 via a wireless network 280, e.g. a cellular network, such as a 5G network, which can be a mission critical private wireless (cellular) network. Cloud network 200 comprises a data storage system 201 which may store data in relation to one or more of the lighting and sensor devices 9, 10 and/or of the power supply unit 1 of the signalling system 100. Such data is transmitted by one or more of the various wireless communication gateway devices described hereinabove over the cellular network 280 and may comprise identifier data, monitoring data and/or operational data, possibly along with respective time stamps.

By way of example, the first communication gateway device 41 can be configured to wirelessly transmit via cellular network 280 monitoring data in relation to the power supply unit 1, or of the overall signalling system, e.g. transformer impedance measurements, to the cloud network 200. The communication gateway devices 18, 28, 58, 68 can be configured to wirelessly transmit via cellular network 280 monitoring data in relation to a lighting device 9 and/or measurement data from one or more sensor devices 10 to the cloud network 200. The cellular communication capability of the central communication unit and/or of the signalling units hence allows an increased amount of data to be transmitted. Therefore, systems as described herein allow to gather additional data in relation to operation and status condition of the signalling system 100 compared to the prior art systems. This data is advantageously used to improve maintenance of the signalling system, and/or to provide improved awareness relating to a malfunctioning or defect of the signalling system.

Data storage system 201 may be a remote system, e.g. where the data is stored in a cloud system. In this case, part or all of the data communicated from the cellular communication gateway devices of the signalling system to the cloud network 200 can also be stored locally, e.g. in a data storage system linked to master control unit 6. Hence, the data communicated to and/or stored in cloud network 200 may be redundant. Alternatively, data storage system 201 may be a local system, e.g. arranged in the ATC tower or on the aerodrome field, and may or may not be linked to the master control unit 6.

A user interface 300, such as a computer, handheld tablet or mobile device, advantageously with cellular network communication capabilities, used by maintenance operators, can communicate (wirelessly, over cellular network 280) with cloud network 200 to access the data relating to signalling system 100 stored in data storage system 201. This allows maintenance operators to access maintenance-relevant data of the signalling system 100 more easily, even from remote locations.

It will be appreciated that the cellular communication gateway devices as described herein can feature any one or both of the wireless communication capabilities as described above in relation to FIG. 1 and FIG. 5.

Advantageously, the local control unit 12, or the fifth communication gateway device 28 can be configured to act as a communication bridge between the wired (power line) communication and the wireless communication network. By way of example, message signals 21 transmitted via power supply line 3 can be received by the fourth communication gateway device 17, or the communication module 281, and, once appropriately converted (e.g. by processing device 16), transmitted to respectively the third communication gateway device 18 or the wireless communication module 282 for wireless transmission, or vice versa. In particular, some signalling units 2 may act as communication hubs where data is collected from nearby signalling units and transferred between the wired communication network (power supply line 3) and the wireless communication network. This may also obviate the need of signal repeaters and amplifiers on the power supply line 3.

Figure 6:
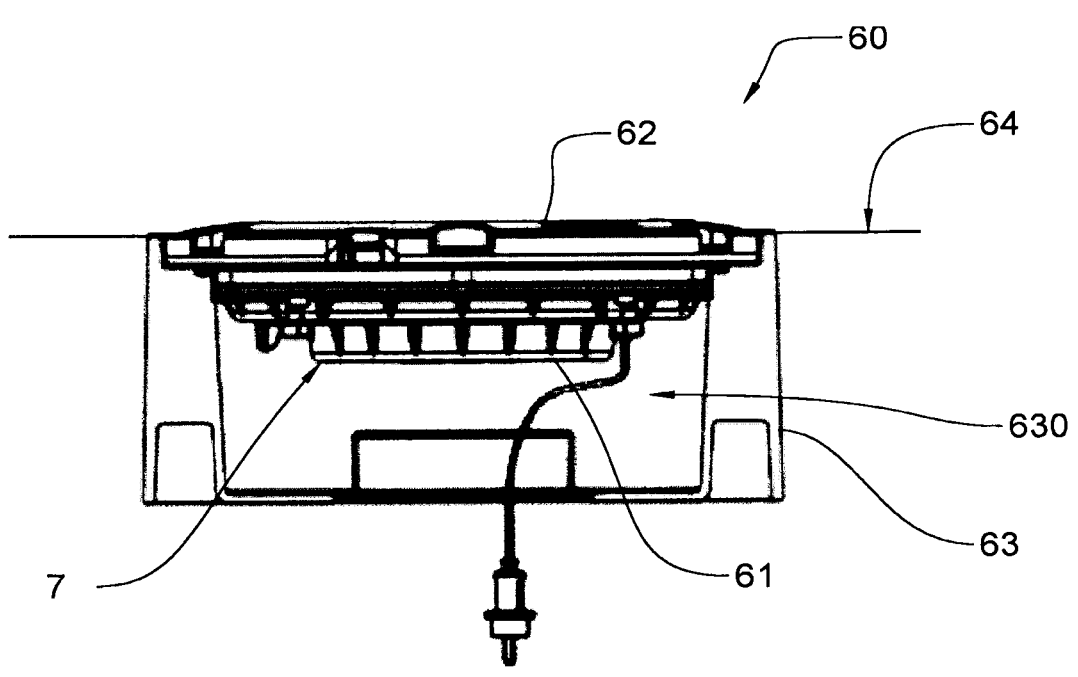
FIG. 6 represents a diagram of an AGL light fixture according to aspects as described herein.

Antenna 19 coupled to communication gateway device 18, 28, 58 or 68 as the case may be is advantageously configured to emit and/or receive radio signals in a frequency range defined by the wireless communication technology that is utilized. One major challenge in antenna designs for light fixtures of the above kind, is to obtain a workable bandwidth and signal strength outside the housing 7 while the antenna keeps a small footprint. Referring to FIG. 6, an AGL light fixture 60, which can correspond to any of the signalling units 2, 30, 40 of FIGS. 2-4, comprises a housing 7 accommodating the lighting device (light source), any sensor devices and the local control unit as described above. Housing 7 comprises a mounting pan 61 which is closed by a lid 62 that water tightly seals the mounting pan 61. Light fixture 60 can be mounted in an inset base 63 which provides a mounting recess 630 with respect to ground level 64 and provides connection to the power line. Housing 7 is secured in inset base 63 such that the lid 62 is substantially flush with, or has a minimal protrusion from, the ground level 64. Both the mounting pan 61 and the lid 62 can be made of a metallic material, which can be electrically conductive. The inset base 63 can be made of concrete, an epoxy material or metal.

It will be convenient to note that other guidance light fixtures can be mounted in sloped or vertical surfaces, such as walls. Possible applications are at heliports and in tunnels. In such case, the ground level 64 can correspond to such sloped or vertical surface.

Figure 7:
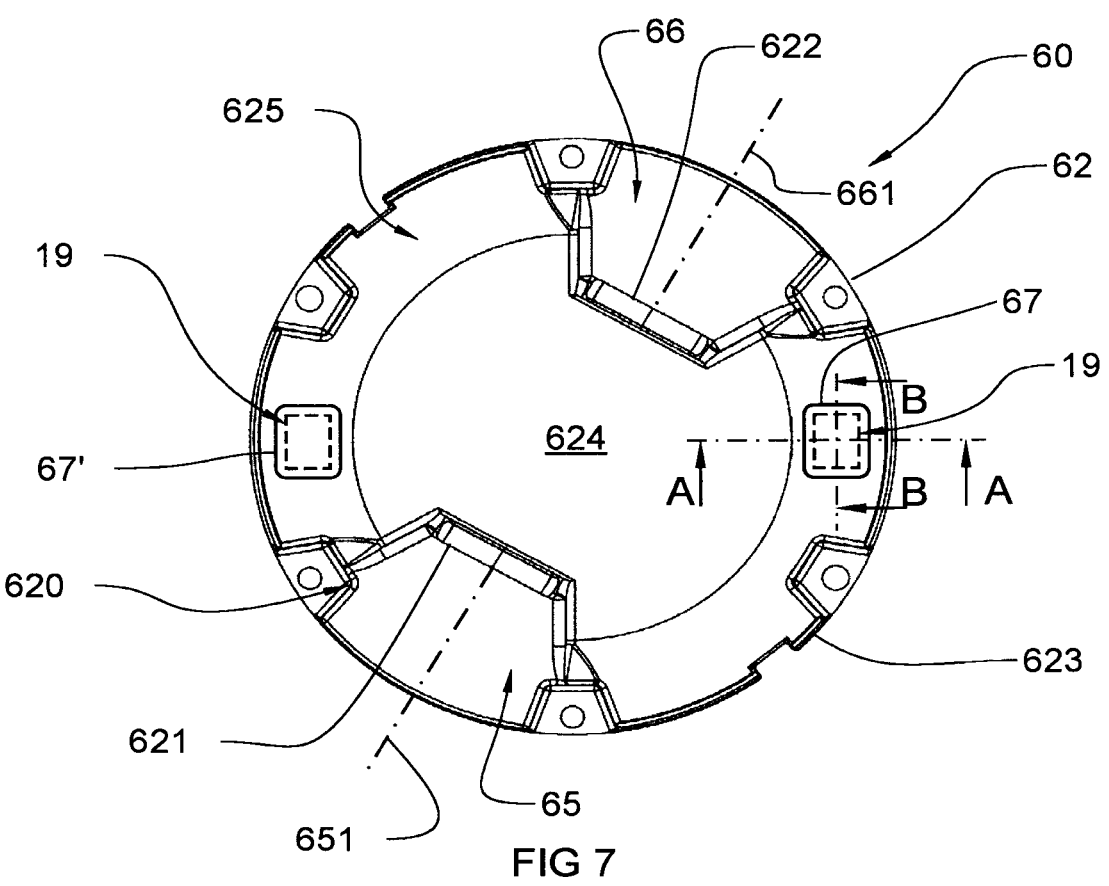
FIG. 7 represents a top view of the AGL light fixture of FIG. 6, illustrating the cover lid of an exemplary embodiment of an aeronautic runway light.

Referring to FIGS. 7-9, the lid 62 comprises an external (exposed) surface 620 with a central portion 624 and a peripheral portion 625 that surrounds the central portion 624 and extends to the circumferential edge 623 of the lid 62. The central portion 624 can be planar or curved and is advantageously elevated with respect to the edge 623 and the ground level 64. The peripheral portion 625 can be sloped substantially from an elevated level of the central portion 624 to the ground level of the edge 623. The slope angle β of the peripheral portion is typically between 5° and 30°, advantageously between 5° and 20°, particularly between 6° and 15°. The central portion 624 and the peripheral portion 625 can be dome-shaped or shaped as a spherical cap.

Two recessed portions 65, 66, although only one, or more than two, may be provided as desired, are provided on the external surface 620. These recessed portions 65, 66 are recessed compared to the central portion 624 and the peripheral portion 625. In each of the recessed portions, an optical window 621, 622 respectively is provided, particularly in the central portion 624. The optical windows 621, 622 provide an exit path for a light beam generated by the light source within the housing 7 along respective optical axes 651, 661. The optical windows may be made in any suitable manner as known in the art, e.g. made of glass or another suitable material. The light generated by the light source may be conditioned by an optical assembly as known in the art, e.g. comprising lenses, collimators and the like (not shown), before it exits through the optical window 621, 622. The optical windows are water tightly secured in through openings defined in the lid 62. In the example of FIG. 7, the optical windows 621, 622 are arranged to direct light beams in substantially opposite directions, although other orientations are possible.

On the external surface 620, one or more further recesses 67, 67' are provided in the lid 62. Recess 67, 67' comprises a bottom 671 and an opposite opening 672 that forms a possibly closed edge in the external surface 620. Recess 67 is advantageously provided on the sloped peripheral portion 625 of the external surface 620, adjacent the circumferential edge 623 of the lid 62. Antenna 19 is arranged in the recess 67, advantageously on bottom 671. Antenna 19 is advantageously completely sunk in the recess 67. A thickness T of antenna 19 is advantageously smaller than a depth D of the recess, D being the distance between bottom 671 and opening 672.

A potting compound 675, such as a polyurethane or an epoxy compound, at least partially fills recess 67, and optionally borehole 674. Advantageously, the antenna 19 is (completely) embedded in, or covered by, the potting compound. The potting compound 675 may be flush with the external surface 620 (peripheral portion 625), preventing dirt to accumulate in recess 67, or on top of antenna 19. Alternatively, or in addition, an appropriate cover transparent to radio waves, e.g. glass, can be provided to close the opening 672 of recess 67. Such a cover can be suitably secured in recess 67 to provide a water-tight seal as known in the art.

A groove 673 can be provided in the bottom 671 of the recess 67 to accommodate a wire connection to the antenna 19. A borehole 674 extends through the lid 62, from the recess 67 (groove 673) to an internal space 69 of the housing 7. Internal space 69 can be a chamber enclosed by the mounting pan 61 and lid 62 which houses electrical equipment, such as the local control unit and the third communication gateway device which is coupled to antenna 19. An electrical wire 195 extends through borehole 674, coupling the antenna 19 to the third communication gateway device arranged in the internal space 69.

The antenna 19 can have a length associated with a resonance or operating frequency, referred to as resonant length. The antenna 19 can further have a width in a direction perpendicular to the length direction. The antenna width can be associated with a(n impedance) bandwidth of the antenna. Antenna axes can be associated with the resonant length and the width, respectively. The antenna 19 is advantageously planar, e.g. substantially extending in or along a plane. By way of example, a patch antenna can be of a rectangular shape with a longer side associated with the resonant length and the shorter side associated with the impedance (band) width. Advantageously, the resonant length of the antenna 19 is oriented to be substantially parallel to a local tangent to the circumferential edge 623. Advantageously, a width of the antenna is oriented to be substantially perpendicular to a local tangent to the circumferential edge 623.

Figure 10:
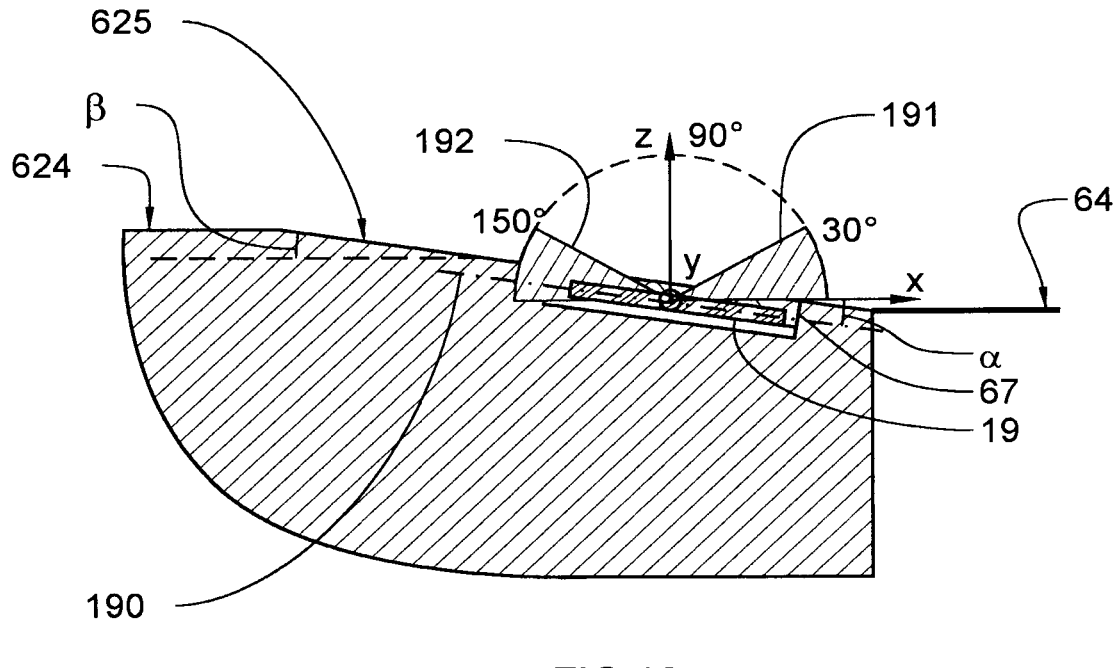
FIG. 10 represents a detail of the cross-section of FIG. 8, showing the inclination angle of the antenna and the coordinate system attached to it.
Figure 11:
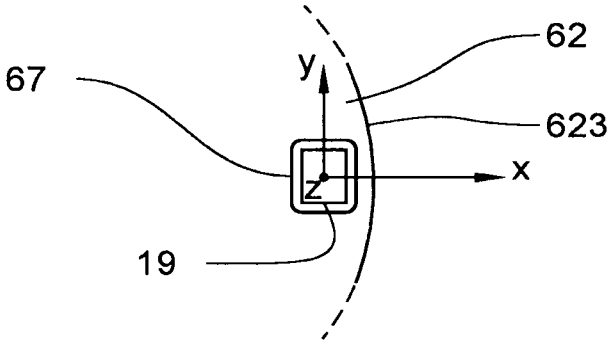
FIG. 11 represents a detail of the top view of FIG. 7, showing the antenna and the coordinate system attached to it.

Antenna 19 is advantageously a directional antenna. Specific examples of suitable directional and/or planar antennas are patch antennas, slot antennas, Vivaldi antennas and loop antennas. Referring to FIGS. 10-11, the directivity of the antenna can be assessed in a Cartesian coordinate system xyz with origin in a (geometric) center of the antenna 19, where the xy-plane is parallel to a ground level plane of the light fixture (e.g. plane of ground level 64), the x-axis points along a radial direction of a circumferential edge 623 of the light fixture (i.e. substantially perpendicular to a local tangent to the circumferential edge 623) and the z-axis points to the elevation direction from the ground level plane. Antenna 19 can be disposed such that the resonant length direction of the antenna (for a rectangular patch antenna, typically the patch length or longer side) in projection on the xy-plane is substantially parallel to the y-axis and, possibly, the impedance width direction (for a rectangular patch antenna, typically the patch width or shorter side) in projection on the xy-plane is substantially parallel to the x-axis. Typically, the antenna 19 is disposed or configured to have a radiation pattern substantially directed away from the light fixture, e.g. in an elevational or z-direction.

Antenna 19 is advantageously disposed or configured to have a radiation pattern which is asymmetrical with respect to the zy-plane. Particularly, antenna 19 is disposed or configured such that its radiation pattern has a higher gain towards the circumferential edge 623 compared to a gain towards the central portion 624. Such a directivity allows more efficient signal transmission and reception with minimal antenna footprint. Particularly, antenna 19 is advantageously disposed or configured such that it has a radiation pattern with a gain in direction of approach to the circumferential edge 623 (e.g., positive x-direction as indicated in FIGS. 10-11) that is at least 3 dBi, advantageously at least 4 dBi, advantageously at least 5 dBi larger compared to the gain in opposite direction (e.g., negative x-direction). Particularly, antenna 19 is advantageously disposed or configured such that it has a radiation pattern having a gain in at least some and preferably all directions within a circle sector

191 between 0° and 30°, advantageously between 0° and 20°, advantageously between 0° and 15°, between 0° and 12° or between 0° and 10° of the xz-plane that is at least 3 dBi, advantageously at least 4 dBi, advantageously at least 5 dBi larger compared to the gain in directions that are mirror symmetrical with respect to the z-axis, i.e. some or all directions within a circle sector 192 between 150° and 180°, advantageously between 160° and 180°, advantageously between 165° and 180°, between 168° and 180° or between 170° and 180° of the xz-plane. Advantageously, antenna 19 is disposed or configured such that it has a radiation pattern with a gain in a hemispherical 30°, 20°, 15°, 12° or 10° sector (measured from positive x-axis) which is at least 3 dBi, advantageously at least 4 dBi, advantageously at least 5 dBi larger compared to the gain in an opposite hemispherical 30°, 20°, 15°, 12° or 10° sector (measured from negative x-axis), i.e. a mirror symmetrical hemispherical sector with respect to the yz-plane.

To obtain such a directivity, the antenna 19 is advantageously arranged inclined with respect to ground level. Specifically, the antenna 19 is arranged in a plane 190 which is inclined at an angle α as seen in the xz-plane between 5° and 55°, advantageously between 5° and 45°, advantageously between 5° and 30°, or advantageously between 6° and 35°, advantageously between 6.5° and 30°, or between 6.5° and 25°, advantageously between 7° and 20°, with the angle α being positive when the antenna plane 190 is sloped towards the edge 623 of the lid 62. In some examples, the resonant length axis of antenna 19 is kept substantially parallel to the ground level 64, e.g. to the y-axis. The antenna can be inclined along the width axis, e.g. to make an angle α with the x-axis In some examples, this is easily achieved when the bottom 671 of recess 67 is inclined at an angle α as indicated above (with respect to the ground level 64, e.g. the horizontal) and the antenna 19 is disposed on the bottom 671, e.g. by making contact with it. Hence, a sloped bottom 671 allows to conveniently position the antenna in an optimal inclined orientation with respect to the ground level, thereby obtaining a desired directivity. Advantageously, angle α substantially corresponds with the slope angle β of the peripheral portion 625 of the lid surface 620. By so doing, antenna 19 can be mounted substantially parallel with the surface of the peripheral portion 625.

Advantageously, antenna 19 is a patch antenna, such that it completely fits in recess 67 without protruding from the plane of the opening 672 of recess 67. A patch antenna for use with radio signals in the frequency range between 3.1 GHz and 4.7 GHz can be made thin, particularly, 2.5 mm or less, advantageously 2 mm or less, and as thin as 1.7 mm or even 1.6 mm, allowing it to fit in a recess having a depth of 3.5 mm or less, or 3 mm or less, 2.5 mm or less, and as small as 2 mm depth. Furthermore, it can have limited dimensions, such as being rectangular with both the longer and the shorter sides having a length of 50 mm or smaller, or 40 mm or smaller, or even 35 mm or smaller. By way of example, with a patch antenna of 27×33 mm a frequency range of 3.3-3.5 GHz can be covered.

Figure 12:
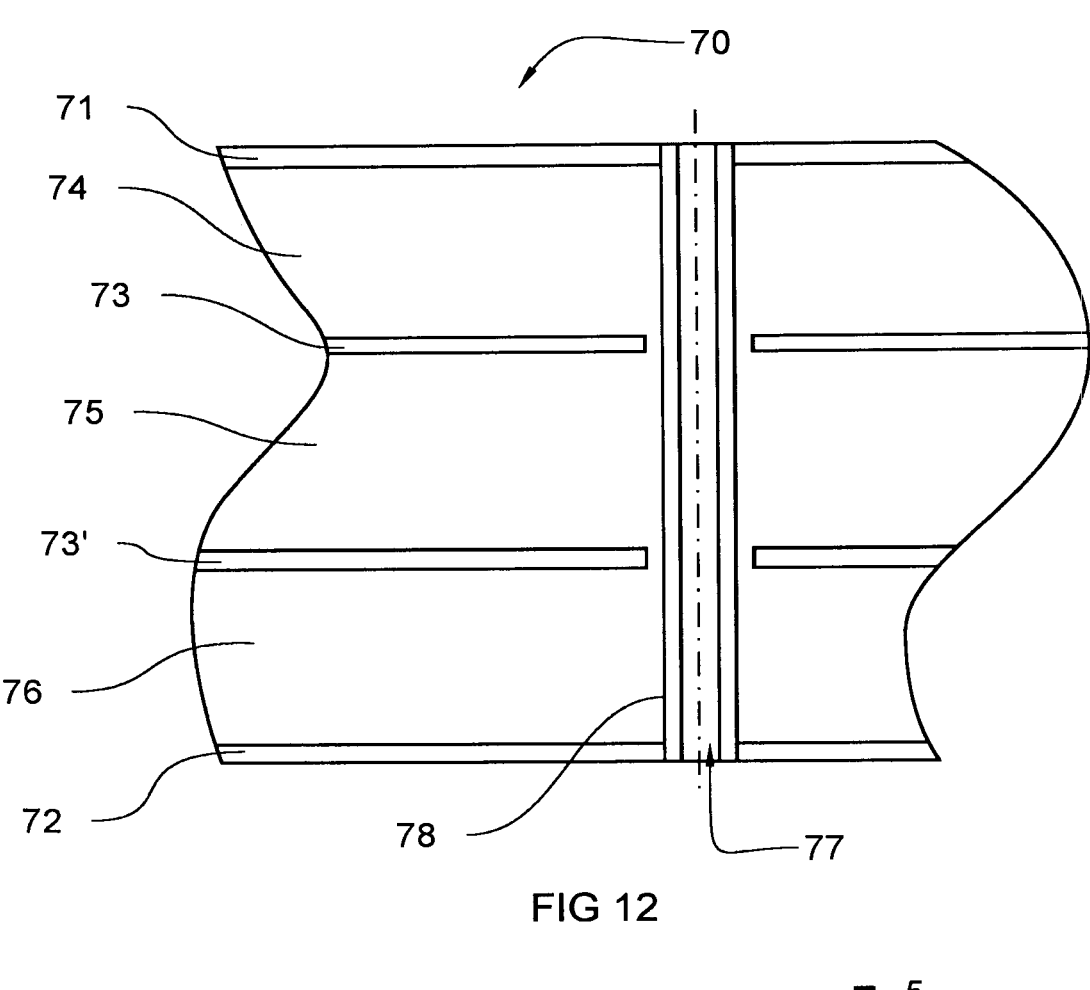
FIG. 12 represents a cross section of a patch antenna for use as the antenna in FIG. 7.

Referring to FIG. 12, a patch antenna 70 for use as antenna 19 in the light fixtures of the present disclosure can comprise or consist of a multilayer board or plate, such as made from a printed circuit board (PCB), with a plurality of electrically conductive (resonant) layers 71, 72, 73, 73' (e.g. copper foil or sheet) separated by one or more dielectric layers 74, 75, 76. The electrically conductive layers 71-73, 73' and the dielectric layers 74-76 are alternatingly stacked on one another. Either one or both the top layer 71 and opposite bottom layer 72 of the stack are advantageously electrically conductive. Possibly, an isolating (dielectric) support (not shown) can be provided underneath the electrically conducting layer 72. The dielectric layers 74, 75, 76 can be made of a same material or they can be different. Advantageously, each of the electrically conductive layers 71, 72, 73, 73' is tuned to a different resonant radio frequency, e.g. by adjusting the resonant length of each layer. As a result, the bandwidth of the antenna is increased without however increasing its footprint.

Typically, the thickness of the dielectric layers 74, 75, 76 is larger than the thickness of the electrically conductive layers 71, 72, 73, 73', e.g. at least by a factor 10, and possibly at least by a factor 20. In some examples, each of the electrically conductive layers 71, 72, 73, 73' can have a thickness between 1 μm and 80 μm, In addition, or alternatively, each of the dielectric layers 74, 75 can have a thickness between 0.050 mm and 1 mm. In one specific example, the antenna 70 comprises three dielectric layers 74, 75, 76 stacked between four electrically conductive layers, including the top layer 71 and the bottom layer 72.

Some or all electrically conductive layers 71, 72, 73, 73' are electrically connected to one another via a feed, which further can be connected to the wire 195. Advantageously, the patch antenna 70 is provided with one or more boreholes 77 extending from the top layer 71 to the bottom layer 72. The internal wall of the borehole 77 is provided with an electrically conductive sheathing 78 that makes up the feed and provides for electrical connection between the electrically conductive layers 71 and 72. Electrically conductive sheathing 78 can be obtained by plating. Possibly, some or all the intermediate electrically conductive layers 73, 73' are electrically isolated from the other conductive layers while being electro-magnetically coupled as shown in FIG. 12.

Referring to FIGS. 17A-17B, another possible patch antenna 80 for use as the antenna 19 is formed as an aperture-coupled patch antenna. Aperture coupled patch antenna 80 comprises a top conductive patch layer 81 and a conductive ground plane 82 which is spaced apart from the top patch layer 81 by one or more dielectric substrate layers 84. The ground plane 82 is provided on a dielectric feeding substrate layer 85. A feed 88, such as a microstrip feed, is provided underneath feeding substrate layer 85. The feed 88 can be provided on a dielectric support layer 86 (back cavity). Further, a conductive lower ground plane 83 can be provided underneath support layer 86. The ground plane 82 is provided with one or more coupling apertures 87 that can be slot-shaped (e.g. rectangular), H-shaped, U-shaped, or have any other suitable shape in the ground plane. The aperture 87 forms a through-hole in the ground plane 82 that allows electromagnetic energy to pass from the feed 88, via the feeding substrate 85 through the aperture 87 into the dielectric space between the ground plane 82 and the patch layer 81 from where it is radiated. The dielectric substrate layer 84 and the dielectric feeding substrate layer 85 can have different permittivity value to properly direct the electromagnetic energy through the aperture 87 and increase the energy radiated from the antenna 80. While in FIG. 17B the position of the aperture and the feed are aligned, it will be appreciated that this is not strictly required and alternative designs can comprise multiple apertures positioned at either side of a microstrip feed line.

Yet another suitable antenna for use as the antenna 19 is a vertical slot patch antenna. These types of patch antenna are structurally similar to antenna 70 and feature one or more slots in the top conductive patch layer. The slot can have any suitable shape such as rectangular, H-shaped or U-shaped.

Figure 13:
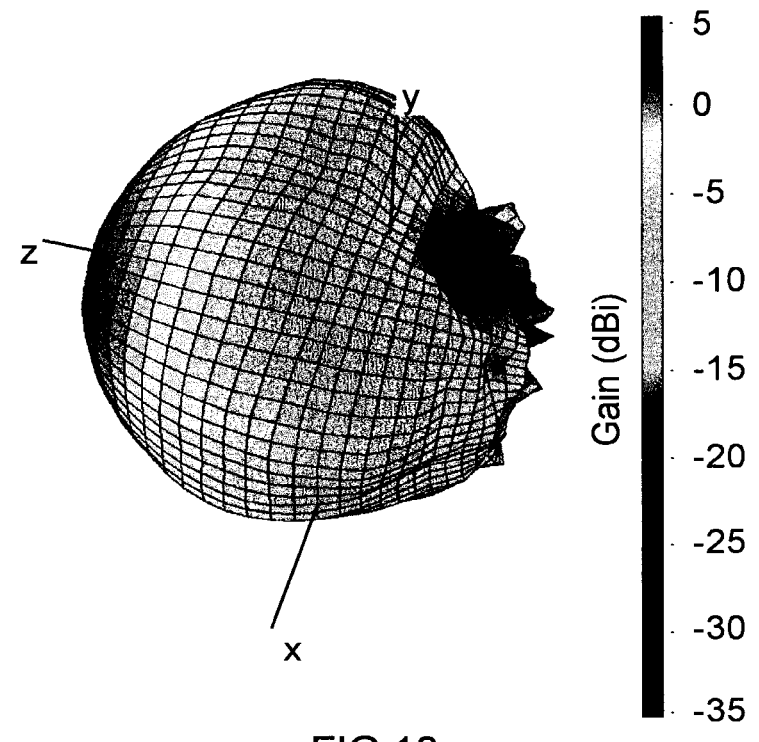
FIG. 13 represents a graph of the measured radiation (gain) pattern of a patch antenna mounted on a runway light fixture.
Figures 14, 15:
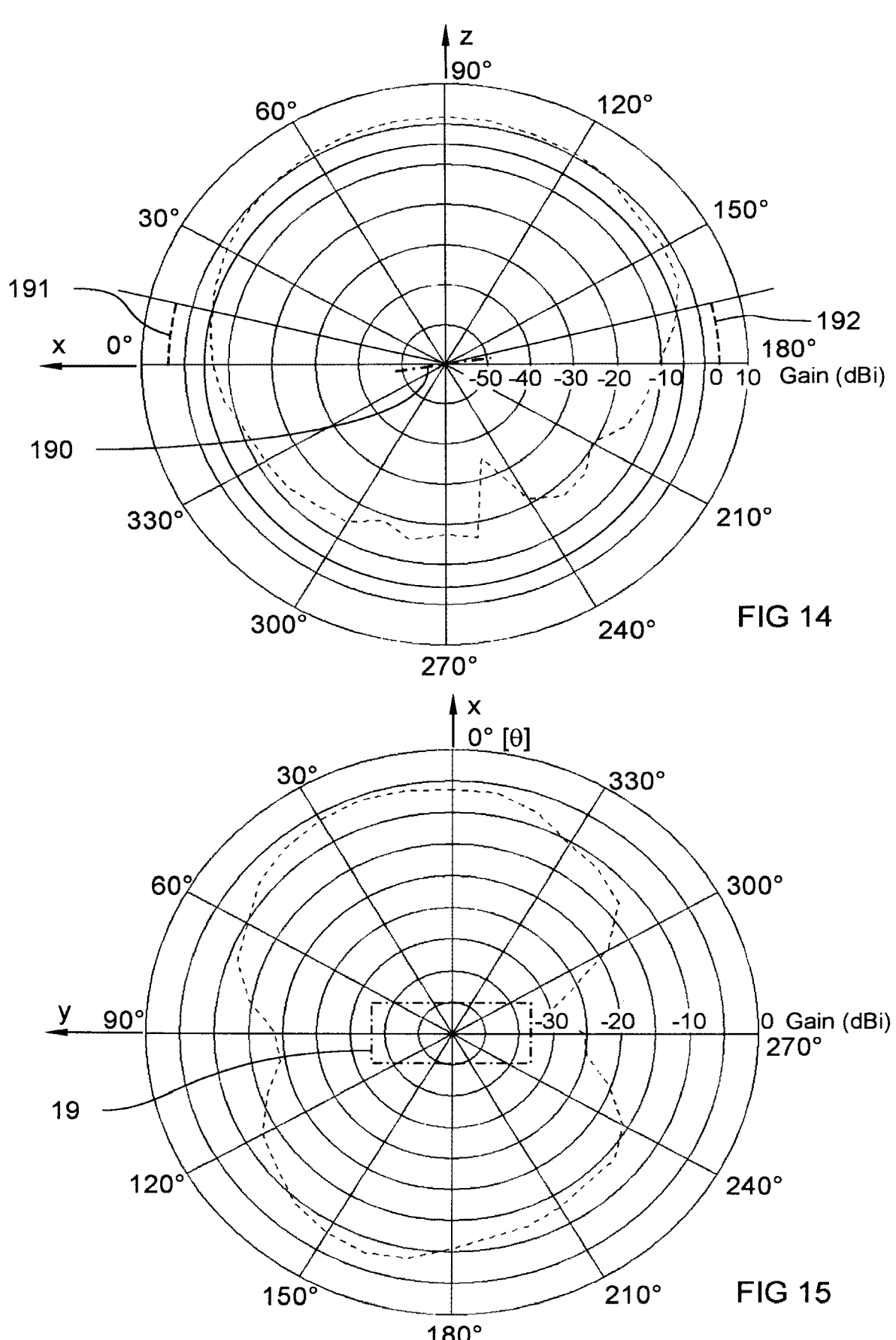
FIG. 14 represents the gain pattern of FIG. 13 in the xz-plane.
FIG. 15 represents the gain pattern of FIG. 14 in the xy-plane.

A patch antenna 70 (FIG. 12) of 27 mm×33 mm having four spaced apart copper layers of 0.18 mm each, with bottom and top layer connected through a single feed probe was mounted on a 12 inch runway light as shown in FIGS. 7-9. The slope α of the patch antenna was about 7.5° according to the definition of FIG. 10. The recess 67 in which the antenna was mounted was sized 37×31 mm to have a 2 mm clearance between the antenna edges and the walls of the recess, all along the antenna perimeter. The recess was spaced about 15 mm from the circumferential edge of the lid. Depth D (FIG. 8) of the recess was 2 mm and total board thickness of the antenna was 1.55 mm. The antenna was potted with a Purtec EH-E83 polyurethane compound (Purtec Kunststoftechniek B.V., The Netherlands) to completely fill the recess and cover the antenna. Only one antenna was provided on the lid cover as test sample. This antenna had an efficiency above 30% in a frequency range between 3.2 and 3.5 GHz. The radiation pattern of the antenna was measured in an anechoic chamber and is shown in FIG. 13. The directivity of the antenna was assessed in the xy-plane and the xz-plane and is shown in FIGS. 14 and 15 respectively. The position and orientation of the antenna plane 190 is represented illustratively. From these figures, it can be seen that the directivity in the xy-plane is asymmetrical with respect to the z-axis. Along the x-axis (at 0° elevational (azimuth) angle, i.e. horizontal plane) a higher gain is obtained in the positive x-direction, i.e. in approach of the circumferential edge of the lid) compared to the opposite direction (negative x-direction, i.e., towards the center of the lid). The gain becomes about equal at both sides at about 15° elevational angle. In the sector 0°-15° (sector 191) compared to the sector 165°-180° (sector 192) the gain is up to 5 dBi higher in a direction towards the circumferential edge. This is particularly beneficial for UWB communication technology, in which radio signals are relayed from the antenna of one AGL light fixture to the antenna of a neighbouring AGL light fixture. Referring to FIG. 15, the silhouette of the antenna 19 is shown illustratively on the gain plot, to show the resonant length side of the antenna is parallel the y-axis and origin of the xyz coordinate system is in the center of the patch antenna. It can be seen that the directivity in the xy (horizontal) plane is asymmetrical with respect to the x-axis with an about 6 dBi higher gain at θ=30° compared to the opposite direction θ=210°. In a direction symmetrical to the x-axis, the gain at θ=30° is about 4 dBi higher compared to θ=330°. Also in this case, the gain in a direction towards the circumferential edge (e.g. sector θ=315° to 45°) is higher of at least about 3 dBi compared to the gain in a direction towards the center of the lid or light fixture (e.g. sector θ=135°-225°).

Referring again to FIG. 7 and FIG. 16, a plurality of antennas 19, such as patch antenna 70, can be arranged on the lid 62, at different angular orientations about the circumference or perimeter of the lid, particularly at diagonally or diametrically opposite positions or about 180° orientation about the circumferential edge 623, e.g. for emitting in opposite directions, or at any other suitable orientation. Additional antennas, e.g. arranged at 120° or 90° angular positions about the circumferential edge can be provided as desired. In FIG. 16, the lid 62 is illustrated without the antennas such that the bottom 671 and the groove 673 of the antenna recess 67 and the second antenna recess 67' is visible. It will be appreciated that the optical axes 651, 661 can themselves be arranged at any convenient angular orientation with respect to one another, e.g. at 180° as shown in FIG. 7, or at a smaller angle as shown in FIG. 16. The antenna axes x,y can be positioned at any convenient angular orientation with respect to the optical axes 651, 661 of the light fixture. Furthermore, it is possible to arrange the antenna recess 67 in a bottom of the recesses 65, 66 of the optical windows, or even in replacement of one or more optical window 621, 622.

Aspects of the present disclosure are set out in the following alphanumerically ordered clauses.

A1. Light fixture (60), comprising:
a light source (9),
a housing (7), wherein the light source is arranged in the housing,
a first antenna (19) configured to emit and/or receive radio frequency signals,
wherein the housing comprises a body part (62) made of an electrically conductive material, wherein the body part has an outer surface (620),
a first recess (67) having a first opening (672) in the outer surface and a bottom (671) opposite the first opening,
wherein the first antenna (19) is a directional antenna and is arranged in the first recess (67).

A2. Light fixture of clause A1, wherein the first antenna is planar, with a plane substantially parallel to a bottom (671) of the first recess or parallel to a plane of the first opening (672).

A3. Light fixture of clause A1 or A2, wherein the first antenna (19) comprises an axis associated with a resonant length, wherein the body part (62) comprises a circumferential edge (623) and the first recess (67) is adjacent the circumferential edge, and wherein the first antenna is mounted in the first recess with the axis being substantially parallel to a local tangent to the circumferential edge.

A4. Light fixture of any one of the clauses A1-A3, wherein the antenna is configured such that along a radial direction of a circumferential edge (623) of the body part and parallel to a mounting plane defined by a plane of the circumferential edge, a radiation pattern of the first antenna when mounted in the first recess has a gain in direction towards the circumferential edge at least 3 dBi higher than a gain in an opposite direction.

A5. Light fixture of any one of the clauses A1-A4, wherein the outer surface further comprises a sloped portion (625) adjacent a circumferential edge (623) of the body part, wherein the sloped portion is inclined with respect to a mounting plane (64) defined by the circumferential edge (623), wherein the first recess (67) is arranged on the sloped portion, preferably the sloped portion has an angle of inclination between 5° and 30° from the mounting plane, measured in a plane that is perpendicular to a local tangent to the circumferential edge.

A6. Light fixture of any one of the clauses A1-A5, wherein a plane of the first antenna is arranged inclined with respect to a mounting plane (64) defined by a circumferential edge (623) of the body part, at an angle between 5° and 30° from the mounting plane, measured in a plane that is perpendicular to a local tangent to the circumferential edge.

A7. Light fixture of any one of the clauses A1-A6, wherein the body part comprises a through opening extending from the external surface, wherein the through opening is closed by an optical window (621, 622), wherein the light source is configured to emit light through the optical window, wherein the optical window and the first recess are spaced apart on the external surface.

A8. Light fixture of any one of the clauses A1-A7, wherein the first antenna is arranged in the first recess such that the first antenna is flush with, or recessed from, a peripheral edge of the first recess.

A9. Light fixture of any one of the clauses A1-A8, wherein the first antenna is at least one of a patch antenna (70), a slot antenna, a Vivaldi antenna and a loop antenna.

A10. Light fixture of any one of the clauses A1-A9, wherein the first antenna is a patch antenna (70), wherein the first antenna comprises at least three electrically conductive layers (71, 72, 73) stacked on one another at a spaced apart distance.

A11. Light fixture of any one of the clauses A1-A10, wherein the first antenna is configured to emit and/or receive radio frequency signals in a frequency range between 3.1 GHz and 10.6 GHz, preferably between 3.1 GHz and 4.7 GHz.

A12. Light fixture of any one of the clauses A1-A11, further comprising a communication module (18) coupled to the first antenna and configured to drive the first antenna, wherein the communication module is arranged in the housing, and wherein the body part (62) comprises a through hole (674) extending from the first recess (67), wherein a feed wire (195) configured to connect the first antenna (19) to the communication module (18) is arranged in the through hole.

A13. Light fixture of any one of the clauses A1-A12, comprising a potting compound (675) arranged in the first recess and covering the first antenna, preferably wherein the first antenna is embedded in the potting compound, preferably wherein the potting compound is substantially flush with a portion of the external surface peripheral to the first recess.

A14. Light fixture of any one of the clauses A1-A13, wherein the housing comprises a mounting pan and the body part is a lid cover of the mounting pan, optionally the mounting pan is made of an electrically conductive material.

A15. Light fixture of any one of the clauses A1-A14, further comprising a second recess (67') arranged in the body part (62) and a second antenna configured to emit and/or receive radio frequency signals arranged in the second recess, and wherein the first recess (67) and the second recess (67') are arranged at opposite sides of the body part.

A16. Light fixture of any one of the clauses A1-A15, being an aeronautic ground light.

The invention claimed is:

1. Aeronautic ground light fixture, comprising:
a light source,
a housing, wherein the light source is arranged in the housing,
a first antenna configured to one of a group consisting of emit, receive, and both emit and receive radio frequency signals,
wherein the housing comprises a body part made of an electrically conductive material, wherein the body part has an outer surface,
a first recess having a first opening in the outer surface and a bottom opposite the first opening,
wherein the first antenna is a planar directional antenna and is arranged in the first recess,
wherein a plane of the first antenna is arranged inclined with respect to a mounting plane defined by a circumferential edge of the body part, at an angle between 5° and 45° from the mounting plane, measured in a plane that is perpendicular to a local tangent to the circumferential edge.

2. Aeronautic ground light fixture of claim 1, wherein the plane of the first antenna is substantially parallel to a bottom of the first recess or parallel to a plane of the first opening.

3. Aeronautic ground light fixture of claim 1, wherein the first antenna comprises an axis associated with a resonant length, wherein the body part comprises a circumferential edge and the first recess is adjacent the circumferential edge, and wherein the first antenna is mounted in the first recess with the axis being substantially parallel to a local tangent to the circumferential edge.

4. Aeronautic ground light fixture of claim 1, wherein the antenna is configured such that along a radial direction of a circumferential edge of the body part and parallel to a mounting plane defined by a plane of the circumferential edge, a radiation pattern of the first antenna when mounted in the first recess has a gain in direction towards the circumferential edge at least 3 dBi higher than a gain in an opposite direction.

5. Aeronautic ground light fixture of claim 1, wherein the outer surface further comprises a sloped portion adjacent a circumferential edge of the body part, wherein the sloped portion is inclined with respect to a mounting plane defined by the circumferential edge, wherein the first recess is arranged on the sloped portion.

6. Aeronautic ground light fixture of claim 1, wherein the plane of the first antenna is arranged inclined with respect to the mounting plane at an angle between 5° and 30°.

7. Aeronautic ground light fixture of claim 1, wherein the body part comprises a through opening extending from the outer surface, wherein the through opening is closed by an optical window, wherein the light source is configured to emit light through the optical window, wherein the optical window and the first recess are spaced apart on the outer surface.

8. Aeronautic ground light fixture of claim 1, wherein the first antenna is arranged in the first recess such that the first antenna is flush with, or recessed from, a peripheral edge of the first recess.

9. Aeronautic ground light fixture of claim 1, wherein the first antenna is at least one of a patch antenna, a slot antenna, a Vivaldi antenna and a loop antenna.

10. Aeronautic ground light fixture of claim 2, wherein the first antenna is a patch antenna.

11. Aeronautic ground light fixture of claim 3, wherein the first antenna comprises at least three electrically conductive layers stacked on one another at a spaced apart distance.

12. Aeronautic ground light fixture of claim 1, wherein the first antenna is configured to one of a group consisting of emit, receive, and both emit and receive radio frequency signals in a frequency range between 3.1 GHz and 10.6 GHz.

13. Aeronautic ground light fixture of claim 1, further comprising a communication module coupled to the first antenna and configured to drive the first antenna, wherein the communication module is arranged in the housing, and wherein the body part comprises a through hole extending from the first recess, wherein a feed wire configured to connect the first antenna to the communication module is arranged in the through hole.

14. Aeronautic ground light fixture of claim 1, comprising a potting compound arranged in the first recess and covering the first antenna.

15. Aeronautic ground light fixture of claim 1, wherein the housing comprises a mounting pan and the body part is a lid cover of the mounting pan.

16. Aeronautic ground light fixture of claim 2, wherein the body part comprises a circumferential edge defining the mounting plane, wherein the outer surface comprises a central portion and a peripheral portion surrounding the central portion and extending to the circumferential edge, wherein the central portion is elevated with respect to the mounting plane and the peripheral portion is sloped from the circumferential edge to the central portion at an angle between 5° and 30°, wherein the first recess is positioned in the sloped portion and wherein the body part comprises at least one through opening closed by a respective optical window and the light source is configured to emit light through the optical window, wherein the at least one through opening is arranged in a respective second recess spaced apart from the first recess.

17. Aeronautic ground light fixture of claim 1, further comprising a second recess arranged in the body part and a second antenna configured to one of a group consisting of emit, receive, and both emit and receive radio frequency signals arranged in the second recess, and wherein the first recess and the second recess are arranged at opposite sides of the body part.

18. Aeronautic ground light fixture of claim 1, wherein the first recess comprises a groove in the bottom and the body part comprises a borehole egressing in the groove, wherein the borehole and the groove accommodate an electrical wire connecting to the first antenna.

19. Aeronautic ground light fixture of claim 5, wherein the sloped portion has an angle of inclination between 5° and 30° from the mounting plane, measured in a plane that is perpendicular to a local tangent to the circumferential edge.

20. Aeronautic ground light fixture of claim 14, wherein the first antenna is embedded in the potting compound.

\* \* \* \* \*